United States Patent
Choi et al.

(10) Patent No.: US 10,182,442 B2
(45) Date of Patent: Jan. 15, 2019

(54) METHOD AND DEVICE FOR PERFORMING COMMUNICATION BY USING PLURALITY OF RESOURCE ARRANGEMENT TECHNIQUES IN WIRELESS LAN SYSTEM

(71) Applicant: LG ELECTRONICS INC., Seoul (KR)

(72) Inventors: Jinsoo Choi, Seoul (KR); Hangyu Cho, Seoul (KR); Wookbong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/566,205

(22) PCT Filed: Apr. 25, 2016

(86) PCT No.: PCT/KR2016/004273
§ 371 (c)(1),
(2) Date: Oct. 12, 2017

(87) PCT Pub. No.: WO2016/175517
PCT Pub. Date: Nov. 3, 2016

(65) Prior Publication Data
US 2018/0124788 A1    May 3, 2018

Related U.S. Application Data

(60) Provisional application No. 62/152,967, filed on Apr. 26, 2015.

(51) Int. Cl.
*H04W 4/00* (2018.01)
*H04W 72/04* (2009.01)
(Continued)

(52) U.S. Cl.
CPC .......... *H04W 72/0453* (2013.01); *H04L 5/00* (2013.01); *H04W 84/12* (2013.01)

(58) Field of Classification Search
None
See application file for complete search history.

(56) References Cited

U.S. PATENT DOCUMENTS 8,358,587 B2 *  1/2013  Han .................... H04W 16/14
                                              370/252
8,625,690 B2 *  1/2014  Taghavi Nasrabadi ..................
                                              H04L 5/0023
                                              341/173

(Continued)

FOREIGN PATENT DOCUMENTS

KR    1020130010487    1/2013

OTHER PUBLICATIONS

PCT International Application No. PCT/KR2016/004273, International Search Report dated Jul. 26, 2016, 2 pages.

(Continued)

*Primary Examiner* — Gerald A Smarth
(74) *Attorney, Agent, or Firm* — Lee, Hong, Degerman, Kang & Waimey PC

(57) ABSTRACT

A method and a device for performing communication by using various RUs in a wireless LAN are presented. If a center resource unit located in the vicinity of a DC frequency band exists, whether the corresponding center resource unit is used can be determined according to whether a discontinuous channel allocation is applied. The center resource unit can be used as a null subcarrier for canceling the interference, which becomes a problem due to the discontinuous channel allocation. If the center resource unit is used as the null subcarrier, the center resource unit is inserted into (Continued)

different frequency chunks, thereby mitigating the interference that can be generated for each frequency chunk.

12 Claims, 22 Drawing Sheets

(51) Int. Cl.
*H04L 5/00* (2006.01)
*H04W 84/12* (2009.01)

(56) References Cited

U.S. PATENT DOCUMENTS

| 9,025,428 B2* | 5/2015 | Jones, IV | H04L 5/0046 |
| | | | 370/203 |
| 9,698,863 B2* | 7/2017 | Teplitsky | H04L 25/06 |
| 2014/0050255 A1 | 2/2014 | Azizi et al. | |
| 2014/0286238 A1 | 9/2014 | Erceg et al. | |
| 2015/0010098 A1 | 1/2015 | Kenney et al. | |
| 2015/0078287 A1* | 3/2015 | Kim | H04W 16/14 |
| | | | 370/329 |
| 2015/0271002 A1* | 9/2015 | Oh | H04L 27/2626 |
| | | | 370/329 |

OTHER PUBLICATIONS

"IEEE Standard for Information Technology—Telecommunications and Information Exchange Between Systems—Local and Metropolitan Area Networks—Specific Requirements," Part 11: Wireless LAN Meduim Access Control (MAC) and Physical Layer (PHY) Specification, Amendment 5: Enchancement for Higher Throughput, Oct. 29, 2009, 536 pages.

* cited by examiner

FIG. 1
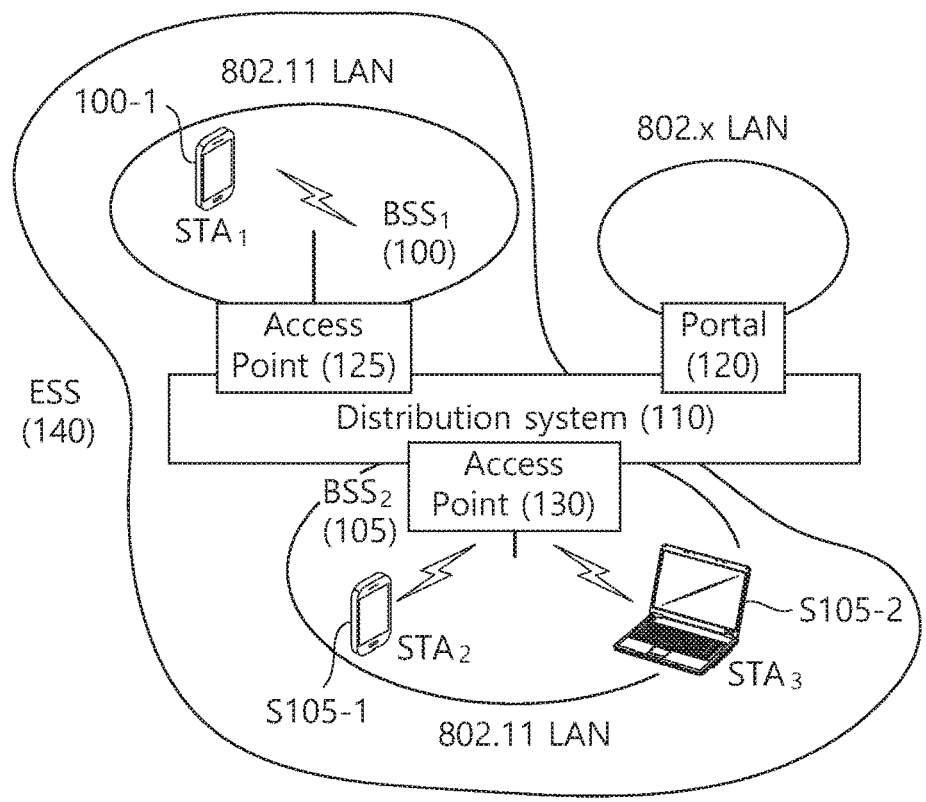
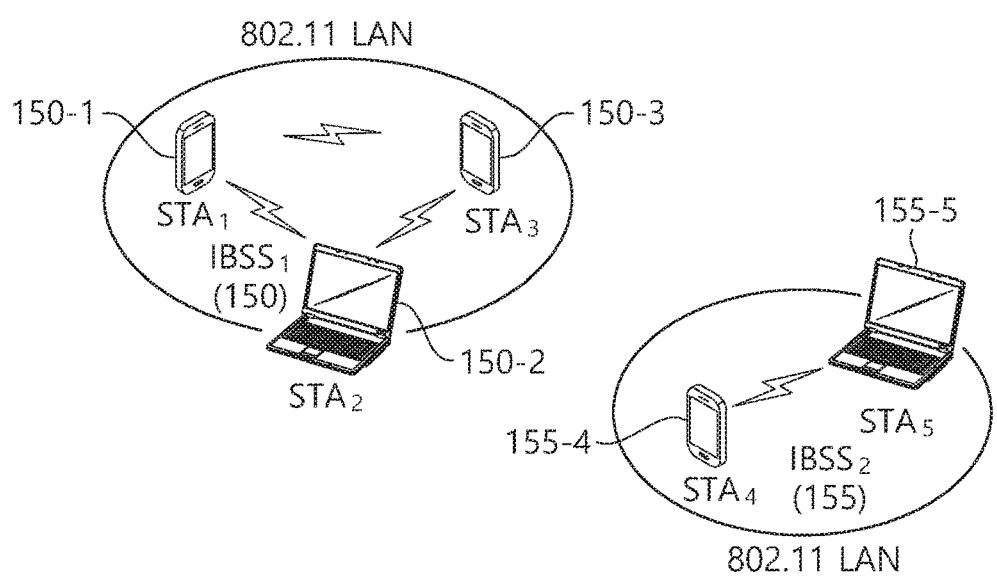

METHOD AND DEVICE FOR PERFORMING COMMUNICATION BY USING PLURALITY OF RESOURCE ARRANGEMENT TECHNIQUES IN WIRELESS LAN SYSTEM

CROSS-REFERENCE TO RELATED APPLICATIONS

This application is the National Stage filing under 35 U.S.C. 371 of International Application No. PCT/KR2016/004273, filed on Apr. 25, 2016, which claims the benefit of U.S. Provisional Application No. 62/152,967, filed on Apr. 26, 2015, the contents of which are all hereby incorporated by reference herein in their entirety.

BACKGROUND OF THE INVENTION

Field of the Invention

The present invention relates to wireless communication and, most particularly, to a method and device for transmitting data by selectively using a plurality of resource arrangement techniques in a wireless LAN system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

Technical Objects

An example of this specification relates to an efficient method for arranging units, in case diverse sizes of resource units are used.

An example of this specification relates to an efficient method for arranging units, in a situation where a channel is non-contiguously allocated.

Technical Solutions

This specification proposes a method and device for transmitting a signal by using a plurality of resource units (RUs) having subcarriers allocated thereto in a wireless LAN system.

The example according to this specification includes a step of determining, by a transmitting station, whether or not to apply non-contiguous channel allocation not using at least one of a plurality of unit channels.

In case the non-contiguous channel allocation is not applied, the transmitting station may configure a PPDU by using a first resource unit arrangement.

In case the non-contiguous channel allocation is applied, the transmitting station may configure a PPDU by using a second resource unit arrangement.

In case the first resource unit arrangement is used, the transmitting station may configure the PPDU by using a central resource unit (RU) including a non-contiguous tone group within a central frequency band including a DC band.

In case the second resource unit arrangement is used, the transmitting station may configure the PPDU without using the central RU.

Effects of the Invention

According to an example of this specification, in case diverse sizes of resource units are used, units may be efficiently arranged.

According to an example of this specification, in a situation where a channel is non-contiguously allocated, units may be efficiently arranged.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

Figure 2:
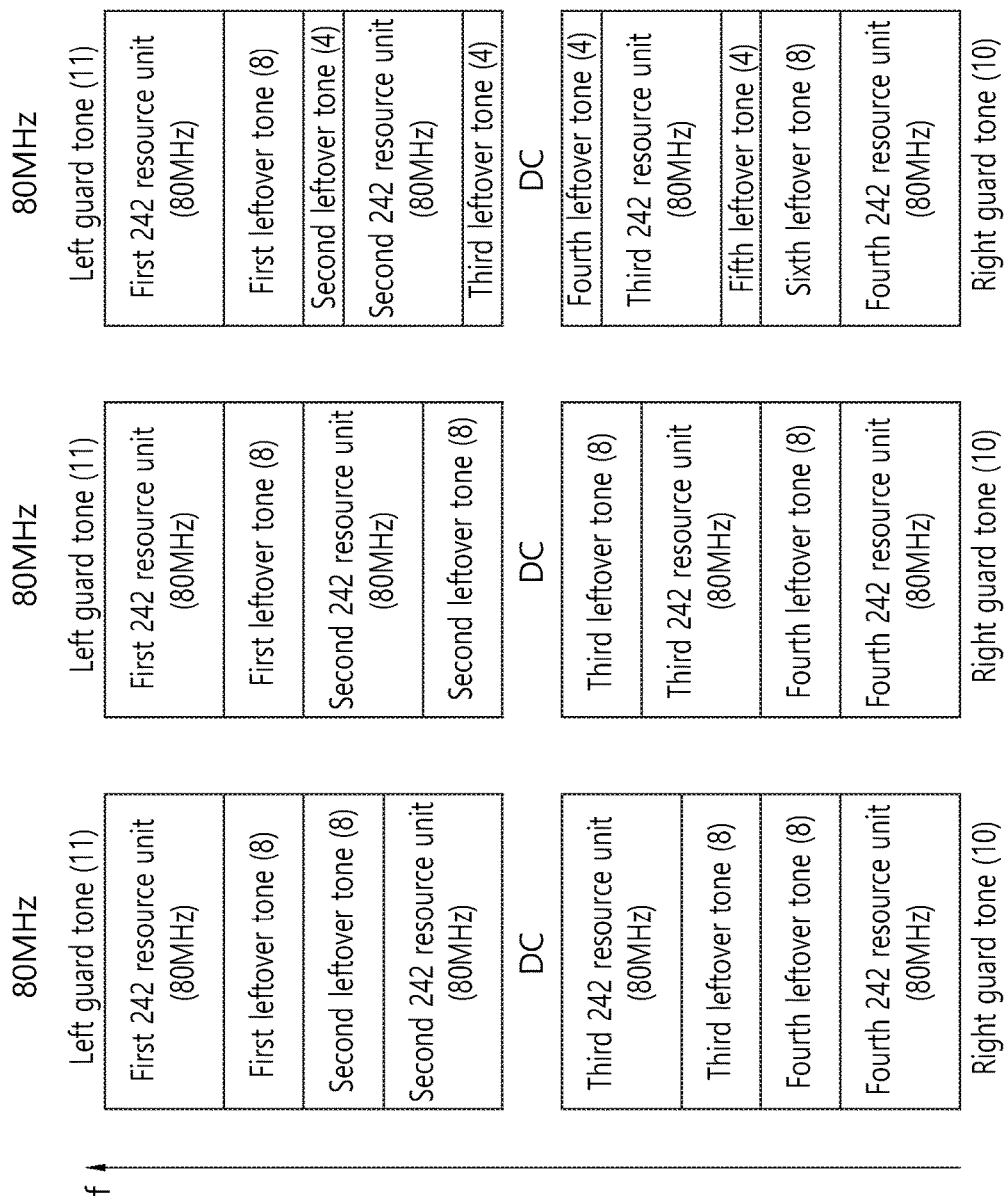
FIG. 2 is a conceptual view illustrating a resource allocation method within an 80 MHz bandwidth according to an exemplary embodiment of the present invention.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBS S, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Hereinafter, in the embodiment of the present invention, data (or a frame) which the AP transmits to the STA may be expressed as a term called downlink data (or a downlink frame), and data (or a frame) which the STA transmits to the AP may be expressed as a term called uplink data (or an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (or a MAC protocol data unit (MPDU)). The PPDU header may include a PHY header and a PHY preamble and the PSDU (or MPDU) may include the frame or indicate the frame (or an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the conventional LAN system, the whole bandwidth may be used for downlink transmission to one STA and uplink transmission to one STA based on single user-orthogonal frequency division multiplexing (SU-OFDM) transmission. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (or the downlink frame and the downlink PPDU) to the plurality of respective STAs through the plurality of respective frequency resources on an overlapped time resource. The plurality of frequency resources may be a plurality of subbands (or sub channels) or a plurality of resource units (RUs). The DL MU OFDMA transmission may be used together with the DL MU MIMO transmission. For example, the DL MU MIMO transmission based on a plurality of space-time streams (or spatial streams) may be performed on a specific subband (or sub channel) allocated for the DL MU OFDMA transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (or the downlink frame and the downlink PPDU) to the plurality of respective STAs through the plurality of respective frequency resources on an overlapped time resource. The plurality of frequency resources may be a plurality of subbands (or sub channels) or a plurality of resource units (RUs). The DL MU OFDMA transmission may be used together with the DL MU MIMO transmission. For example, the DL MU MIMO transmission based on a plurality of space-time streams (or spatial streams) may be performed on a specific subband (or sub channel) allocated for the DL MU OFDMA transmission.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

When the uplink transmission by the plurality of respective STAs is performed on the frequency domain, different frequency resources may be allocated to the plurality of respective STAs as uplink transmission resources based on the OFDMA. The different frequency resources may be different subbands (or sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (or spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (or spatial streams) may be performed on a specific subband (or sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

In case the OFDMA-based method and device according to the exemplary embodiment of the present invention is used, resource allocation units that are each defined to have a different size may be used. The corresponding resource allocation unit may be expressed by using diverse terms, such as unit, resource unit, frequency unit, and so on. And, the size of each unit may be expressed as a tone unit corresponding to the subcarrier. The resource unit may be diversely configured. For example, the resource unit may be defined to have diverse sizes, such as 26 tones, 52 tones, 56 tones, and so on.

The resource unit may be allocated within the entire bandwidth (or available bandwidth) while considering a left guard tone and a left guard tone, which are respectively positioned on each end of the entire bandwidth for interference mitigation, and a direct current (DC) tone, which is positioned at a center of the bandwidth. Moreover, the basic resource unit may also be allocated while considering leftover tones (or remaining tones) that may be used for the purpose of user allocation separation (or per STA resource allocation), common pilot, automatic gain control (AGC), phase tracking, and so on.

The allocation method (allocation number, allocation location, etc.) of the basic resource unit within the entire bandwidth may be configured by considering resource application efficiency, scalability (or extendibility) according to the entire bandwidth. The allocation method of the basic resource unit may be defined in advance or may be signaled based on diverse methods (e.g., signaling based on a signal field that is included in a PPDU header of a PPDU).

Also, according to the exemplary embodiment of present invention, a virtual allocation resource unit including a tone corresponding to a combination between at least a plurality of resource units may be defined, and resource allocation that is based on the virtual allocation resource unit may be performed. The resource allocation that is based on the virtual allocation resource unit may also be expressed differently by using the term virtualization.

The virtual allocation resource unit may correspond to a resource unit for re-using an interleaver size and OFDM numerology (or tone numerology).

More specifically, in case 242 tones are allocated to one STA, the conventional pilot allocation and the convention interleaver size may be used. More specifically, among the 242 tones, pilot tones may be allocated to 8 tones, and data tones may be allocated to the remaining 234 tones. Interleaving that is based on the 234-size interleaver may be performed on the 234-tone data tone.

In this case, the data interleaving procedure and the pilot insertion procedure may be performed identically as in the legacy STA being allocated with 242 tones. More specifically, even in a case when a 242-tone structure is not physically supported, one virtual 242-tone resource unit may be allocated to the STA. In this case, an interleaving procedure using the legacy 234-size interleaver and an insertion procedure of the legacy pilot tone (8 pilot tones) may be used. Such 242-tone resource unit may also be expressed differently by using the term 242-tone or multiple of 242 tones (e.g., 484, 968, and so on). Alternatively, a size of the virtual allocation resource unit may also be determined based on another interleaver size (108, 52, 24, and so on) that was used in the legacy wireless LAN system.

The resource allocation method of each bandwidth, which is described below, is merely an example. And, therefore, resource allocation may also be performed within each bandwidth by using a variety of methods other than the example presented below.

The detailed values shown below may be varied.

For example, for a 20 MHz bandwidth, 6 tones may be defined as a left guard tone, 3 tones may be defined as a direct current (DC) tone, and 5 tones may be defined as a right guard tone, and two 56-tone resource units and five 26-tone resource units may be allocated within the bandwidth. Alternatively, nine 26-tone resource units may be allocated as a virtual allocation resource unit.

For example, a detailed allocation within the frequency band of 20 MHz may correspond to 56/26/26/13/DC/13/26/26/56 or 26/26/13/56/DC/56/13/26/26. 56 indicates a resource unit 56 tones, 26 indicates a resource unit of 26 tones, and 13 indicates a resource unit of 13 tones, which is a divided half of 26 tones.

For example, for a 40 MHz bandwidth, 6 tones may be defined as a left guard tone, 9 tones may be defined as a DC tone, and 5 tones may be defined as a right guard tone, and the remaining 492 tones may be divided into two sets, and three 56-tone resource units and three 26-tone resource units may be allocated to each of the two sets divided from 492 tones. A detailed allocation within the frequency band of 40 MHz may correspond to 56/56/26/26/26/56/DC/56/26/26/26/56/56.

For example, for an 80 MHz bandwidth, 11 tones may be defined as a left guard tone, 3 tones may be defined as a DC tone, and 10 tones may be defined as a right guard tone, and the remaining 1000 tones may be divided into four sets, and four 56-tone resource units and one 26-tone resource unit may be allocated to each of the four divided sets of 250 tones. Nine 26-tone resource units may be allocated to each of the four 250-tone units corresponding to half of 20 MHz or 40 MHz. A detailed allocation within the frequency band of 40 MHz may correspond to 56/56/56/56/26/26/56/56/56/56/DC/56/56/56/56/26/26/56/56/56/56.

Hereinafter, this exemplary embodiment discloses a tone numerology for reducing interference between stations in a wireless LAN system, wherein a station using a 20 MHz bandwidth as a front-end bandwidth, a station using a 40 MHz bandwidth as a front-end bandwidth, and a station using an 80 MHz bandwidth as a front-end bandwidth may co-exist. Meanwhile, since a front-end bandwidth indicates a maximum bandwidth that is available for usage, for example, a station using the 40 MHz bandwidth as the front-end bandwidth may also use a 20 MHz bandwidth.

Hereinafter, a resource allocation method (or tone plan) for the co-existence of devices supporting front-ends of different sizes based on a 242-tone virtual allocation resource unit (or 242-tone resource unit) will be disclosed.

FIG. 2 is a conceptual view illustrating a resource allocation method within an 80 MHz bandwidth according to an exemplary embodiment of the present invention.

In case it is assumed that a left-most guard tone (or left guard tone) of 11 tones, a DC tone of 3 tones, and a right-most guard tone (or right guard tone) of 10 tones are allocated to the 80 MHz front-end bandwidth, FIG. 2 discloses the allocation of resource units within the remaining 1000 tones (1024 tones-24 tones).

1000 tones may be divided into four 250-tone (data tones of 242 tones and leftover tones of 8 tones) units.

Referring to the left side of FIG. 2, 11 (left guard tone)/242/8/8/242/DC/242/8/8/242/10 (right guard tone) may be allocated within the 80 MHz bandwidth. Herein, 242 indicates a 242-tone resource unit, and 8 indicates eight leftover tones.

A plurality of 8-tone leftover tones may be contiguously allocated between 242-tone resource units. The leftover tones being positioned between the 242-tone resource units may be used as guard tones. Two 8-tone leftover tones (a total of 16 leftover tones) may be positioned between a 242-tone resource unit being adjacent to the DC tone and a 242-tone resource unit being adjacent to the left guard tone, and two 8-tone leftover tones (16 tones in total) may be positioned between a 242-tone resource unit being adjacent to the right guard tone and the 242-tone resource unit being adjacent to the DC tone.

Referring to the middle of FIG. 2, 11 (left guard tone)/242/8/242/8/DC/8/242/8/242/10 (right guard tone) may be allocated within the 80 MHz bandwidth. 8 leftover tones may be positioned between 242-tone resource units and to be adjacent to the DC tone (or between a 242-tone resource unit and the DC tone).

Referring to the right side of FIG. 2, 11 (left guard tone)/242/8/4/242/4/DC/4/242/4/8/242/10 (right guard tone) may be allocated within the 80 MHz bandwidth. 4 leftover tones may be respectively allocated to positions being adjacent to the DC tone, and 4 leftover tones and 8 leftover tones may be serially positioned to be adjacent to the 242-tone resource unit being adjacent to the left guard tone. Additionally, 4 leftover tones and 8 leftover tones may be serially positioned to be adjacent to the 242-tone resource unit being adjacent to the right guard tone.

Figure 3:
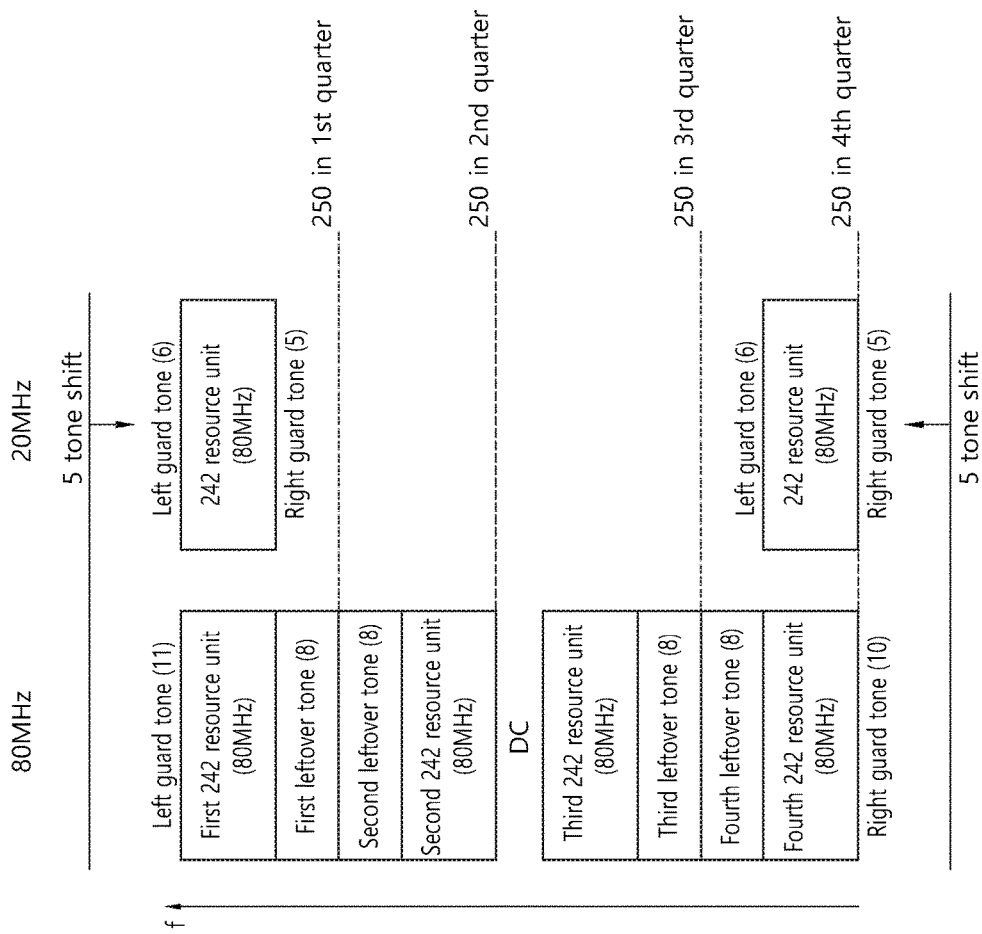
FIG. 3 is a conceptual view illustrating a resource allocation method within a 20 MHz bandwidth according to an exemplary embodiment of the present invention.

FIG. 3 is a conceptual view illustrating a resource allocation method within a 20 MHz bandwidth according to an exemplary embodiment of the present invention.

FIG. 3 discloses a tone numerology for an STA having a 20 MHz front-end bandwidth (or resource allocation within a 20 MHz bandwidth) considering the resource allocation within the 80 MHz bandwidth, which is disclosed on the left side of FIG. 2.

Referring to FIG. 3, a 11-tone left guard tone, a first 242-tone resource unit (80 MHz), an 8-tone first leftover tone, an 8-tone second leftover tone, a second 242-tone resource unit (80 MHz), a DC tone, a third 242-tone resource unit (80 MHz), an 8-tone third leftover tone, a fourth 8-tone leftover tone, a fourth 242-tone resource unit (80 MHz), and a 10-tone right guard tone may be allocated within the 80 MHz bandwidth.

A 6-tone left guard tone, a 242-tone resource unit (20 MHz), and a 5-tone right guard tone may be allocated within the 20 MHz bandwidth.

Hereinafter, although the DC tone will not be considered for simplicity of the description of FIG. 3 to FIG. 5, n number of DC tones may be included in middle positions of 242-tone resource units. In this case, a 6-tone left guard tone, a 242-tone resource unit (20 MHz)+DC tone, and a 5-tone right guard tone may be allocated within the 20 MHz bandwidth.

For example, the allocation position of the first 242-tone resource unit (80 MHz) being adjacent to the 11-tone left guard tone, which is allocated within the 80 MHz bandwidth, and the allocation position of the 242-tone resource unit (20 MHz), which is allocated within the 20 MHz bandwidth, may be configured to be identical to one another. In order to configure the allocation position of the first 242-tone resource unit (80 MHz) to be identical to the allocation position of the 242-tone resource unit (20 MHz), which is allocated within the 20 MHz bandwidth, within the frequency axis, the allocation start position of the left guard tone defined in the 20 MHz bandwidth may be positioned at a location that is shifted by 5 tones along a decreasing direction of the frequency as compared to the allocation start position of the left guard tone defined in the 80 MHz bandwidth.

More specifically, in order to configure the allocation position of the first 242-tone resource unit (80 MHz) to be identical to the allocation position of the 242-tone resource unit (20 MHz), which is allocated within the 20 MHz bandwidth, the allocation start position of the 20 MHz bandwidth may be shifted by 5 tones along the decreasing direction of the frequency based on the allocated start position of the 80 MHz bandwidth.

Conversely, in order to configure the allocation position of the first 242-tone resource unit (80 MHz) to be identical to the allocation position of the 242-tone resource unit (20 MHz), which is allocated within the 20 MHz bandwidth, the allocation start position of the 20 MHz bandwidth may be fixed, and the allocation start position of the 80 MHz bandwidth may be shifted by 5 tones along an increasing direction of the frequency.

Alternatively, the allocation position of the fourth 242-tone resource unit (80 MHz) being adjacent to the 10-tone right guard tone, which is allocated within the 80 MHz bandwidth, and the allocation position of the 242-tone resource unit (20 MHz), which is allocated within the 20 MHz bandwidth, may be configured to be identical to one another. In this case, the allocation start position of the right guard tone defined in the 20 MHz bandwidth may be positioned at a location that is shifted by 5 tones along an increasing direction of the frequency as compared to the allocation start position of the right guard tone defined in the 80 MHz bandwidth.

More specifically, in order to configure the allocation position of the fourth 242-tone resource unit (80 MHz) to be identical to the allocation position of the 242-tone resource unit (20 MHz), which is allocated within the 20 MHz bandwidth, the allocation start position of the 20 MHz bandwidth may be shifted by 5 tones along the increasing direction of the frequency based on the allocated start position of the 80 MHz bandwidth.

Conversely, in order to configure the allocation position of the fourth 242-tone resource unit (80 MHz) to be identical to the allocation position of the 242-tone resource unit (20 MHz), which is allocated within the 20 MHz bandwidth, the allocation start position of the 20 MHz bandwidth may be fixed, and the allocation start position of the 80 MHz bandwidth may be shifted by 5 tones along a decreasing direction of the frequency.

In order to configure the allocation position of the second 242-tone resource unit (80 MHz) and the allocation position of the 242-tone resource unit (20 MHz), which is allocated within the 20 MHz bandwidth, separate shifting is not required to be performed. Similarly, in order to configure the allocation position of the third 242-tone resource unit (80 MHz) and the allocation position of the 242-tone resource unit (20 MHz), which is allocated within the 20 MHz bandwidth, separate shifting is not required to be performed.

Figure 4:
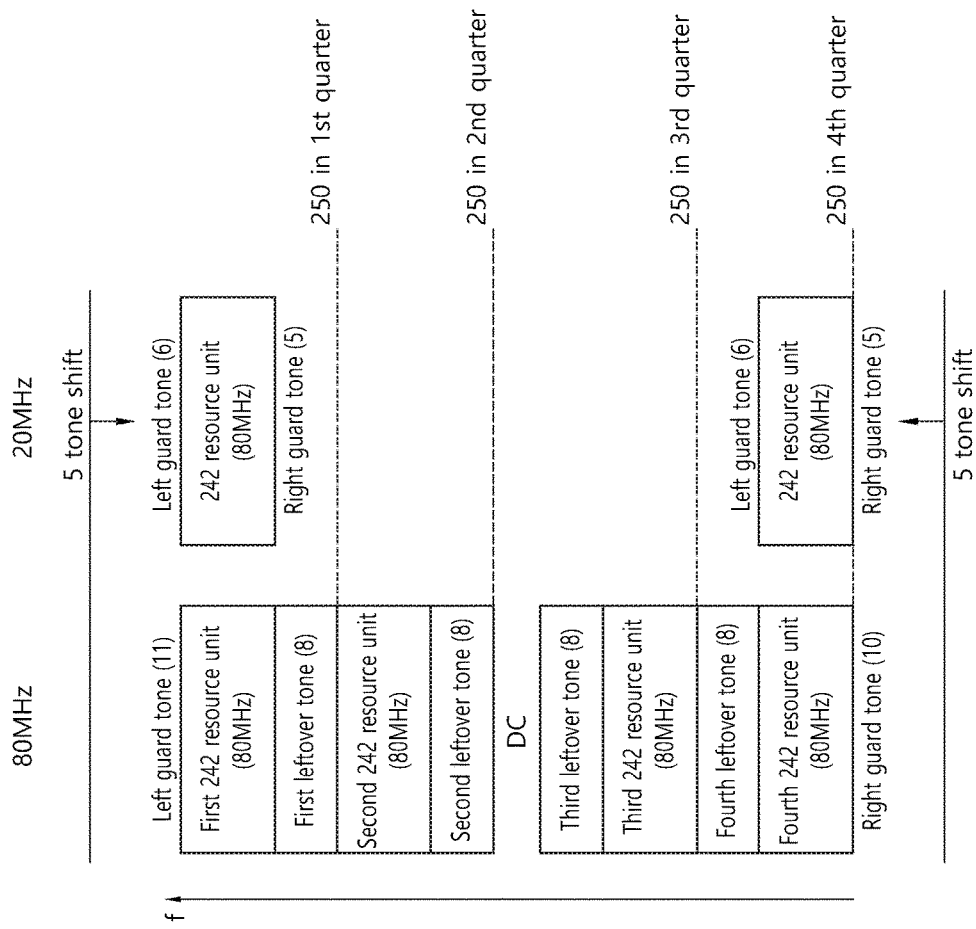
FIG. 4 is a conceptual view illustrating a resource allocation method within a 20 MHz bandwidth according to an exemplary embodiment of the present invention.

FIG. 4 is a conceptual view illustrating a resource allocation method within a 20 MHz bandwidth according to an exemplary embodiment of the present invention.

FIG. 4 discloses a tone numerology for an STA having a 20 MHz front-end bandwidth considering the resource allocation within the 80 MHz bandwidth, which is disclosed in the middle of FIG. 2.

As shown in the drawing, the technical characteristics that are described in FIG. 3 are equally applied in FIG. 4 with the exception that, in comparison with FIG. 3, the detailed positions of the tones are different. Therefore, additional description of FIG. 4 will be omitted.

Figure 5:
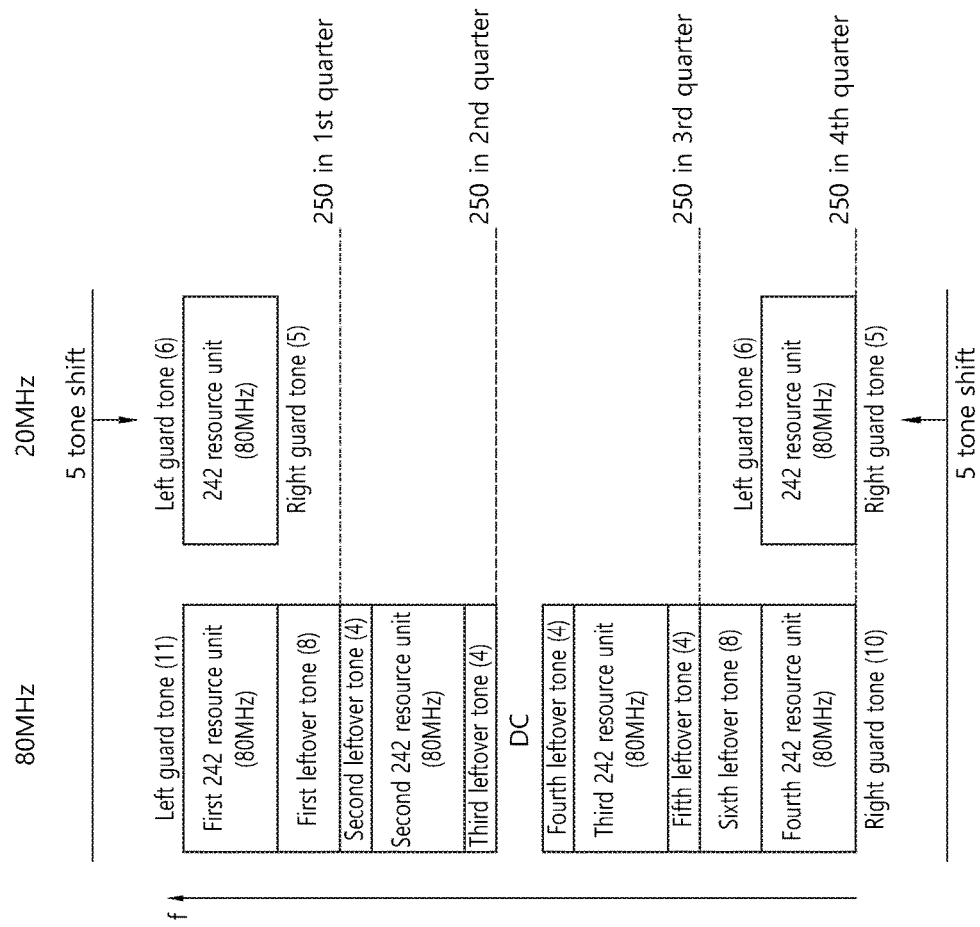
FIG. 5 is a conceptual view illustrating a resource allocation method within a 20 MHz bandwidth according to an exemplary embodiment of the present invention.

FIG. 5 is a conceptual view illustrating a resource allocation method within a 20 MHz bandwidth according to an exemplary embodiment of the present invention.

FIG. 5 discloses a tone numerology for an STA having a 20 MHz front-end bandwidth considering the resource allocation within the 80 MHz bandwidth, which is disclosed on the right side of FIG. 2.

As shown in the drawing, the technical characteristics that are described in FIG. 3 are equally applied in FIG. 5 with the exception that, in comparison with FIG. 3, the detailed positions of the tones are different. Therefore, additional description of FIG. 5 will be omitted.

Figure 6:
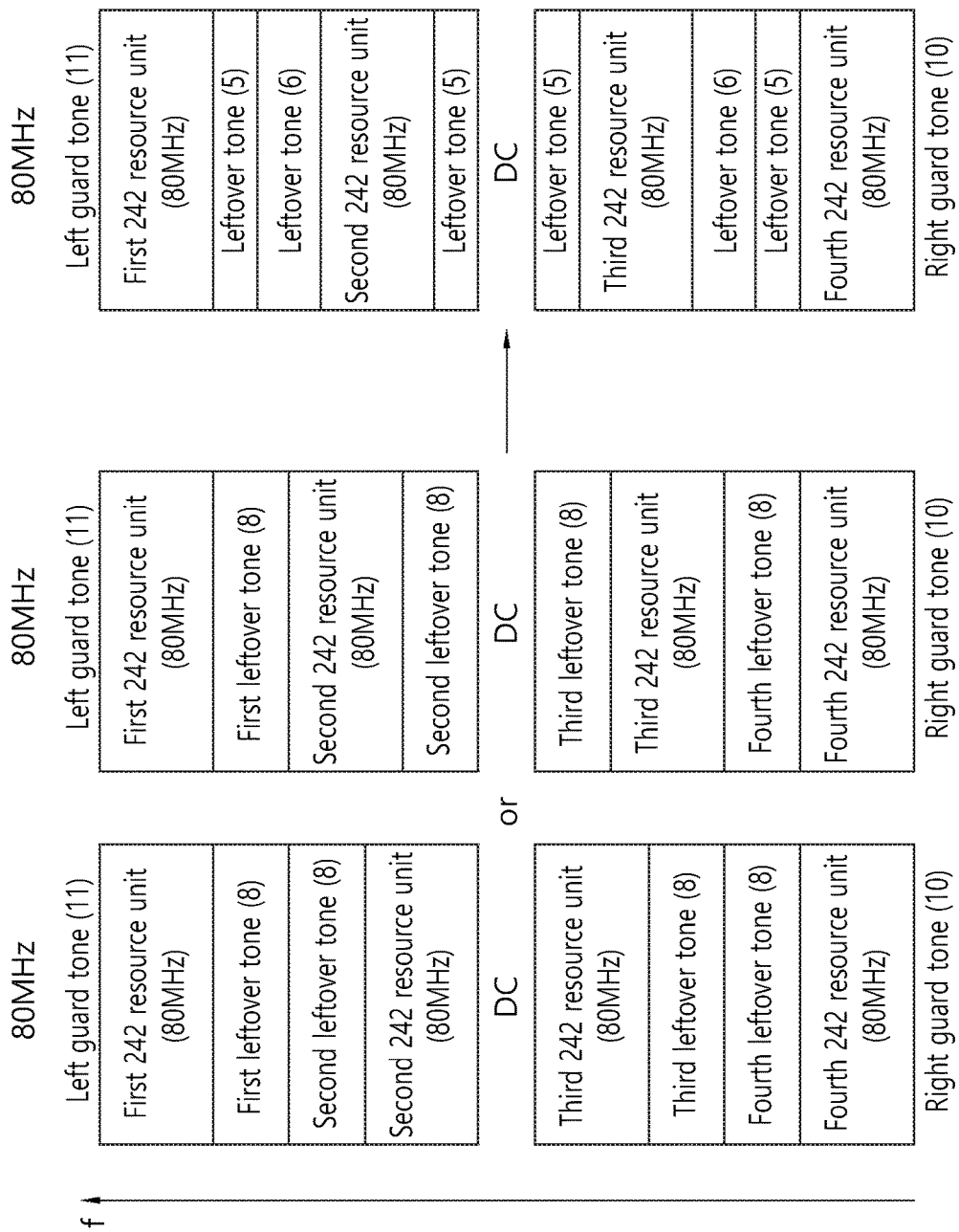
FIG. 6 is a conceptual view illustrating an allocation of a left guard tone according to an exemplary embodiment of the present invention.

FIG. 6 is a conceptual view illustrating an allocation of a left guard tone according to an exemplary embodiment of the present invention.

Referring to FIG. 6, an 8-tone left guard tone may be divided into a 5-tone left guard tone and a 3-tone left guard tone, and a 6-tone left guard tone may be generated by extracting a 3-tone left guard tone from each of the two 8-tone left guard tones and then combining the extracted 3-tone left guard tones. The position of the 6-tone left guard tone may be allocated to correspond to the position of the 6-tone left guard tone within the 20 MHz bandwidth, and the position of the remaining 5-tone (8 tones-3 tones) left guard tone may be allocated to correspond to the position of the 5-tone right guard tone within the 20 MHz bandwidth.

Although the DC tone within the 20 MHz bandwidth has not been defined in FIG. 2 to FIG. 5, it is preferable that the DC tone is defined in the 20 MHz bandwidth. More specifically, it is preferable that a predetermined number of tones are additionally allocated within the 20 MHz bandwidth as the DC tone.

Figure 7:
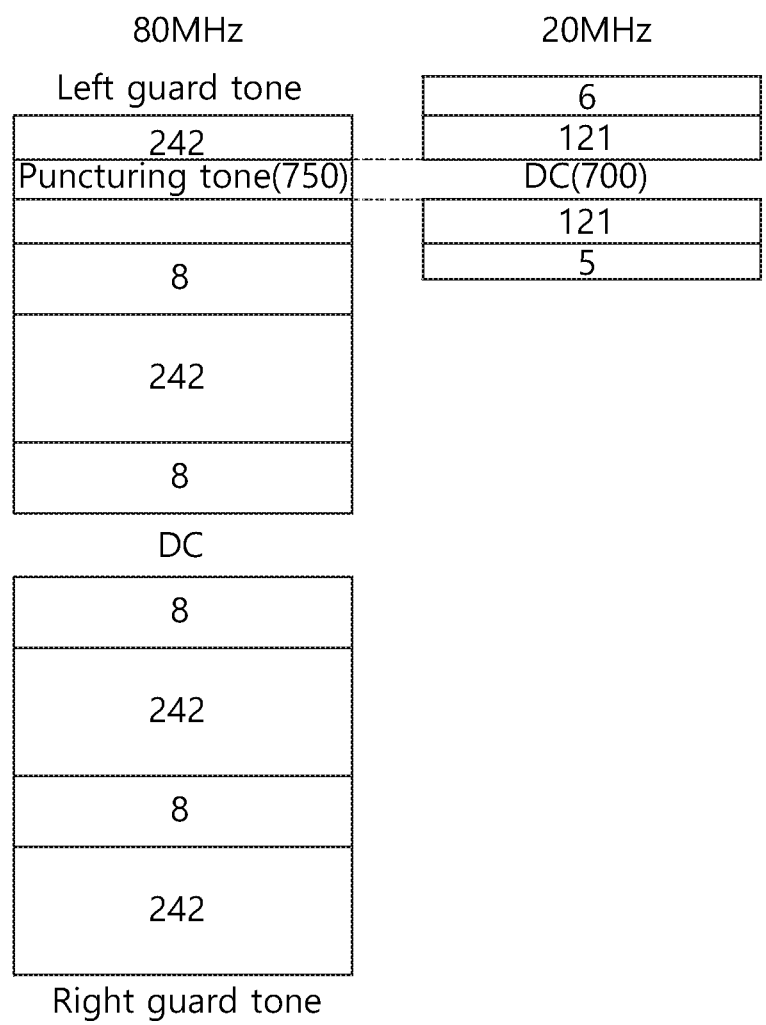
FIG. 7 is a conceptual view illustrating a resource allocation method within a 20 MHz bandwidth according to an exemplary embodiment of the present invention.

FIG. 7 is a conceptual view illustrating a resource allocation method within a 20 MHz bandwidth according to an exemplary embodiment of the present invention.

FIG. 7 discloses a resource allocation within the 20 MHz bandwidth additionally considering the DC tone within the 20 MHz bandwidth.

Referring to FIG. 7, n number of DC tones 700 may be included in the 20 MHz bandwidth in addition to the left guard tone/right guard tone/resource unit of 242 tones (hereinafter referred to as 242-tone resource unit (20 MHz)). In this case, tones corresponding to the positions of the n number of DC tones 700 in the 242-tone resource unit (hereinafter referred to as 242-tone resource unit (80 MHz)), which is allocated to a location corresponding to the 242-tone resource unit being allocated within the 20 MHz bandwidth, may be punctured (or processed with puncturing). More specifically, the position of the DC tone 700 defined in the 20 MHz bandwidth may be configured to be identical to the position of a puncturing tone 750, which is included in the 242-tone resource unit (80 MHz).

If the number of tones being allocated as the DC 700 within the 20 MHz bandwidth is equal to 3, the 3 tones corresponding to the position of the DC tone, which is positioned at the center of the 242-tone resource unit (80 MHz), may be punctured. Alternatively, if the number of tones being allocated as the DC 700 within the 20 MHz bandwidth is equal to 5, the 5 tones corresponding to the position of the DC tone, which is positioned at the center of the 242-tone resource unit (80 MHz), may be punctured.

In case the number if DC tones 700 being allocated within the 20 MHz bandwidth is not small, the number of tones being punctured in the 242-tone resource unit (80 MHz) may become larger. The increase in the number of puncturing tones may lead to a loss in wireless resource within the 80 MHz bandwidth.

Hereinafter, the exemplary embodiment of the present invention discloses a method for reducing the loss in wireless resource, which is caused by an increase in the number of puncturing tones.

Figure 8:
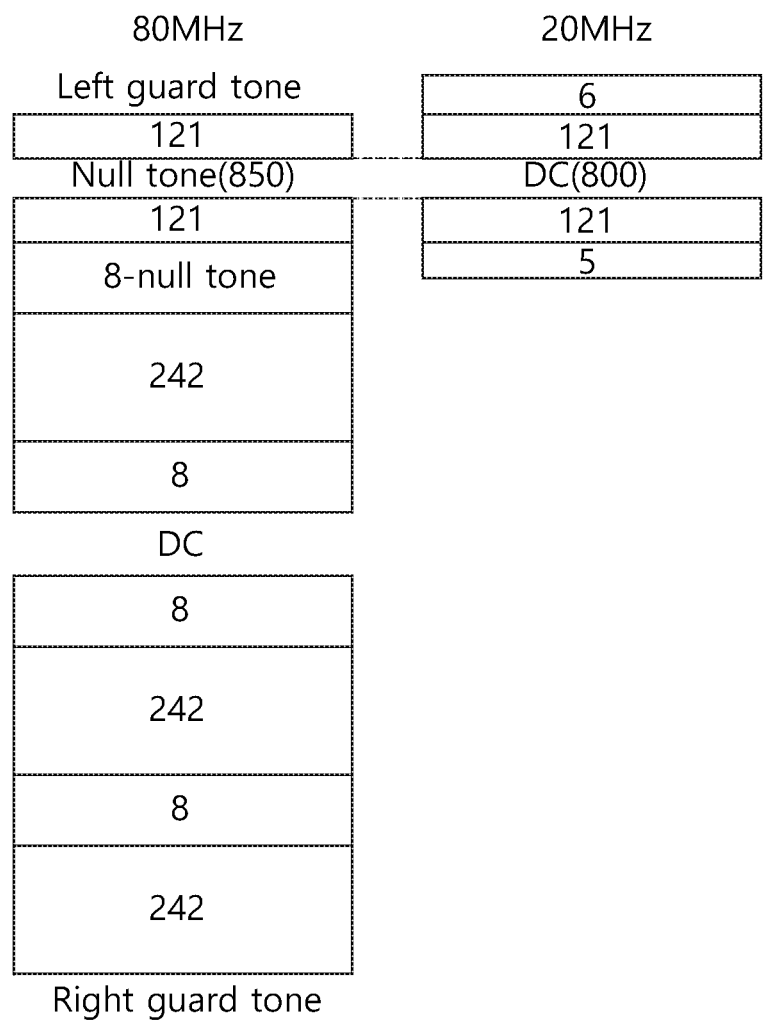
FIG. 8 is a conceptual view illustrating a resource allocation method within a 20 MHz bandwidth according to an exemplary embodiment of the present invention.

FIG. 8 is a conceptual view illustrating a resource allocation method within a 20 MHz bandwidth according to an exemplary embodiment of the present invention.

FIG. 8 discloses a resource allocation within the 20 MHz bandwidth additionally considering the DC tone within the 20 MHz bandwidth. Most particularly, disclosed herein is a method for reducing the loss in wireless resource, which is caused by an increase in the number of puncturing tones.

Null tones 850 corresponding to the number of DC tones 800 may also be inserted in the 242-tone resource unit (80 MHz) so as to correspond to the DC tones, which are defined in the 20 MHz bandwidth. Null tones 850 refers to all types of empty subcarrier that does not carry any signal, such as data.

At this point, part of the guard tones allocated to the 80 MHz bandwidth may be used as null tones 850 and included in the 242-tone resource unit (80 MHz).

The number and position of the null tones being included in the 242-tone resource unit (80 MHz) may be the same as the number and position of DC tones, which are defined in the 20 MHz bandwidth.

This method may be applied to the above-described resource allocation method within the 80 MHz bandwidth and resource allocation method within the 20 MHz bandwidth, which are disclosed in FIG. 2 to FIG. 5.

Figure 9:
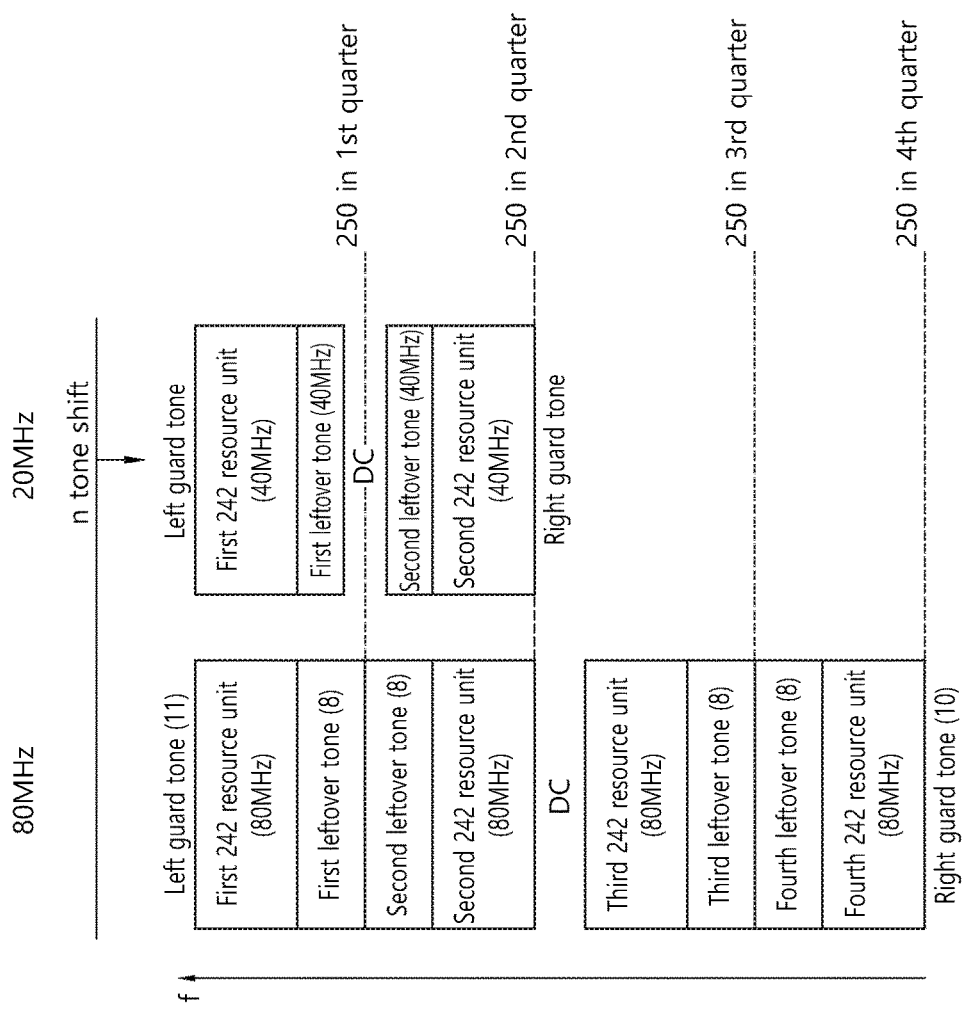
FIG. 9 is a conceptual view illustrating a resource allocation method within a 40 MHz bandwidth according to an exemplary embodiment of the present invention.

FIG. 9 is a conceptual view illustrating a resource allocation method within a 40 MHz bandwidth according to an exemplary embodiment of the present invention.

FIG. 9 discloses a tone numerology for an STA having a 40 MHz front-end bandwidth considering the resource allocation within the 80 MHz bandwidth, which is disclosed on the left side of FIG. 2.

Referring to FIG. 9, the resource allocation for the STA having a 40 MHz front-end bandwidth may be performed based on a left guard tone, a first 242-tone resource unit (40 MHz), a first leftover tone (40 MHz), a DC tone, a second leftover tone (40 MHz), a second 242-tone resource unit (40 MHz), and a right guard tone.

For example, the allocation position of the first 242-tone resource unit (80 MHz) being adjacent to the 11-tone left guard tone, which is allocated within the 80 MHz bandwidth, and the allocation position of the first 242-tone resource unit (40 MHz), which is allocated within the 40 MHz bandwidth, may be configured to be identical to one another. Additionally, the allocation position of the second 242-tone resource unit (80 MHz) being adjacent to the 11-tone left guard tone, which is allocated within the 80 MHz bandwidth, and the allocation position of the second 242-tone resource unit (40 MHz), which is allocated within the 40 MHz bandwidth, may be configured to be identical to one another. For the above-described configuration of the allocation positions within the 40 MHz bandwidth, shifting of the allocation start point of the left guard tone may be performed.

In order to adjust the above-described position configuration, the sum of the first leftover tone, DC tone, and second leftover tone may be configured to be equal to 16 tones, and the remaining tones (512 tones−(484 tones+16 tones)=12 tones) may be configured as the left guard tone and the right guard tone.

Figure 10:
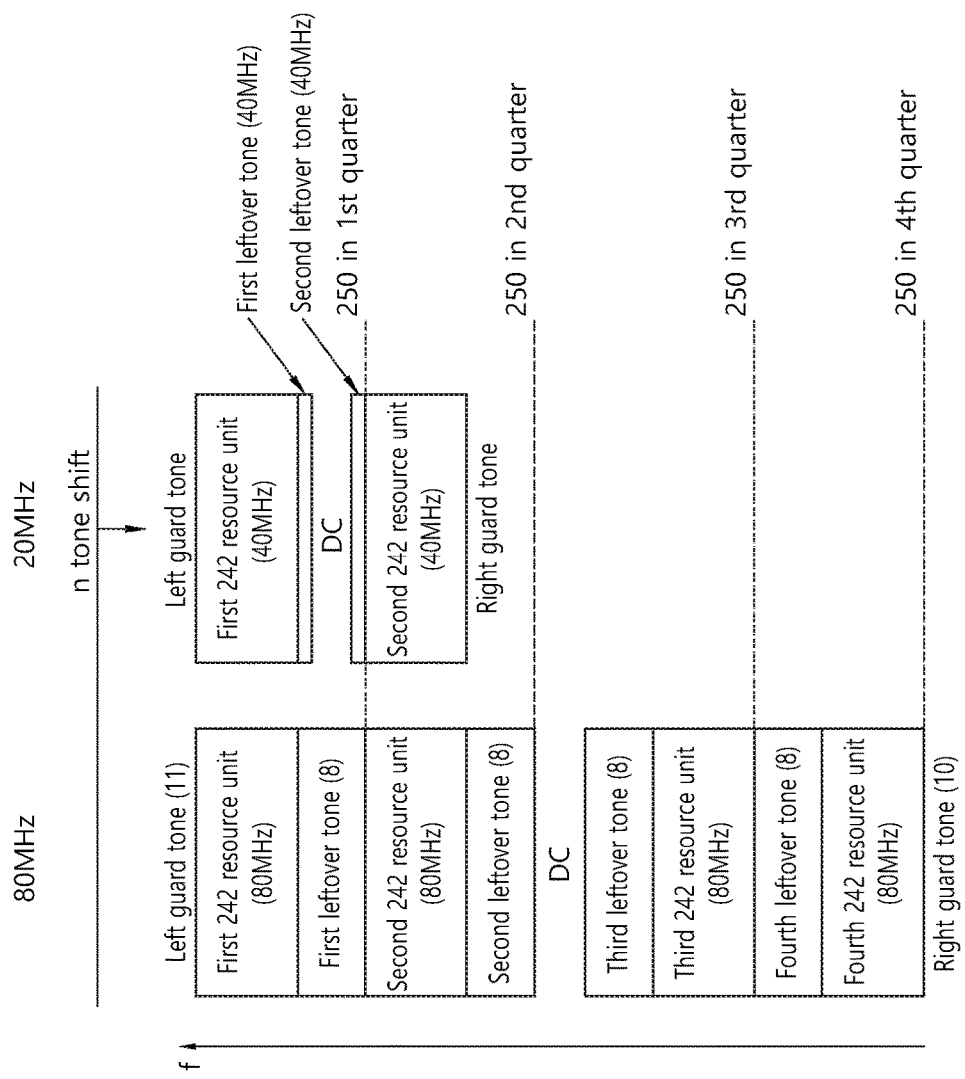
FIG. 10 is a conceptual view illustrating a resource allocation method within a 40 MHz bandwidth according to an exemplary embodiment of the present invention.

FIG. 10 is a conceptual view illustrating a resource allocation method within a 40 MHz bandwidth according to an exemplary embodiment of the present invention.

FIG. 10 discloses a tone numerology for an STA having a 40 MHz front-end bandwidth considering the resource allocation within the 80 MHz bandwidth, which is disclosed in the middle of FIG. 2.

Referring to FIG. 10, the resource allocation for the STA having a 40 MHz front-end bandwidth may be performed based on a left guard tone, a first 242-tone resource unit (40 MHz), a first leftover tone (40 MHz), a DC tone, a second leftover tone (40 MHz), a second 242-tone resource unit (40 MHz), and a right guard tone.

For example, the allocation position of the first 242-tone resource unit (80 MHz) being adjacent to the 11-tone left guard tone, which is allocated within the 80 MHz bandwidth, and the allocation position of the first 242-tone resource unit (40 MHz), which is allocated within the 40 MHz bandwidth, may be configured to be identical to one another. Additionally, the allocation position of the second 242-tone resource unit (80 MHz) being adjacent to the 11-tone left guard tone, which is allocated within the 80 MHz bandwidth, and the allocation position of the second 242-tone resource unit (40 MHz), which is allocated within the 40 MHz bandwidth, may be configured to be identical to one another. For the above-described configuration of the allocation positions within the 40 MHz bandwidth, shifting of the allocation start point of the left guard tone may be performed.

In order to adjust the above-described position configuration, the sum of the first leftover tone, DC tone, and second leftover tone may be configured to be equal to 8 tones, and the remaining tones (512 tones−(484 tones+8 tones)=20 tones) may be configured as the left guard tone and the right guard tone.

Alternatively, the DC tone may be configured to be equal to 8 tones without defining the first leftover tone and the second leftover tone.

Figure 11:
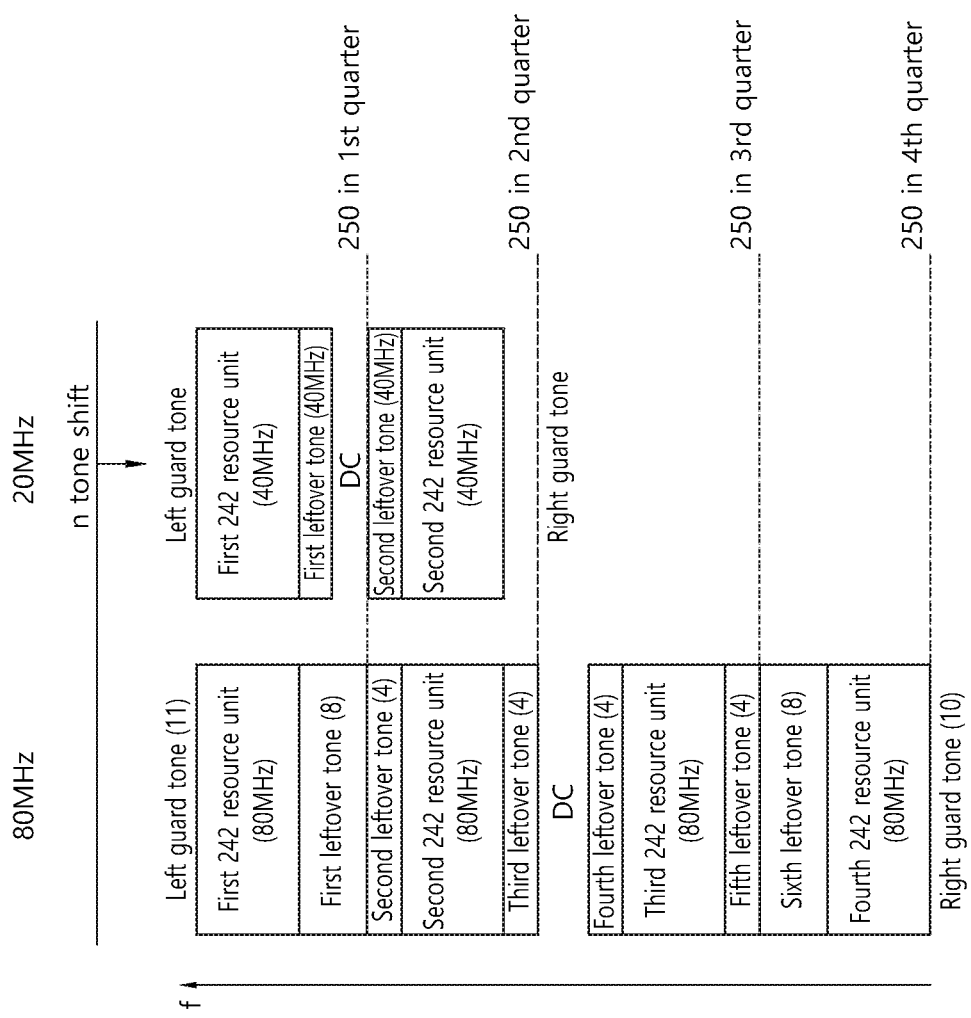
FIG. 11 is a conceptual view illustrating a resource allocation method within a 40 MHz bandwidth according to an exemplary embodiment of the present invention.

FIG. 11 is a conceptual view illustrating a resource allocation method within a 40 MHz bandwidth according to an exemplary embodiment of the present invention.

FIG. 11 discloses a tone numerology for an STA having a 40 MHz front-end bandwidth considering the resource allocation within the 80 MHz bandwidth, which is disclosed on the right side of FIG. 2.

Referring to FIG. 11, the resource allocation for the STA having a 40 MHz front-end bandwidth may be performed based on a left guard tone, a first 242-tone resource unit (40 MHz), a first leftover tone (40 MHz), a DC tone, a second leftover tone (40 MHz), a second 242-tone resource unit (40 MHz), and a right guard tone.

For example, the allocation position of the first 242-tone resource unit (80 MHz) being adjacent to the 11-tone left guard tone, which is allocated within the 80 MHz bandwidth, and the allocation position of the first 242-tone resource unit (40 MHz), which is allocated within the 40 MHz bandwidth, may be configured to be identical to one another. Additionally, the allocation position of the second 242-tone resource unit (80 MHz) being adjacent to the 11-tone left guard tone, which is allocated within the 80 MHz bandwidth, and the allocation position of the second 242-tone resource unit (40 MHz), which is allocated within the 40 MHz bandwidth, may be configured to be identical to one another. For the above-described configuration of the allocation positions within the 40 MHz bandwidth, shifting of the allocation start point of the left guard tone may be performed.

In order to adjust the above-described position configuration, the sum of the first leftover tone, DC tone, and second leftover tone may be configured to be equal to 12 tones, and the remaining tones (512 tones−(484 tones+16 tones)=16 tones) may be configured as the left guard tone and the right guard tone.

Although the allocation of the first 242-tone resource unit (40 MHz) and the second 242-tone resource unit (40 MHz) respectively corresponding to the third 242-tone resource unit (80 MHz) and the fourth 242-tone resource unit (80 MHz) is not disclosed in FIG. 9 to FIG. 11, the corresponding resource units may be allocated by using the same allocation method as the first 242-tone resource unit (40 MHz) and the second 242-tone resource unit (40 MHz) respectively corresponding to the first 242-tone resource unit (80 MHz) and the second 242-tone resource unit (80 MHz).

Figure 12:
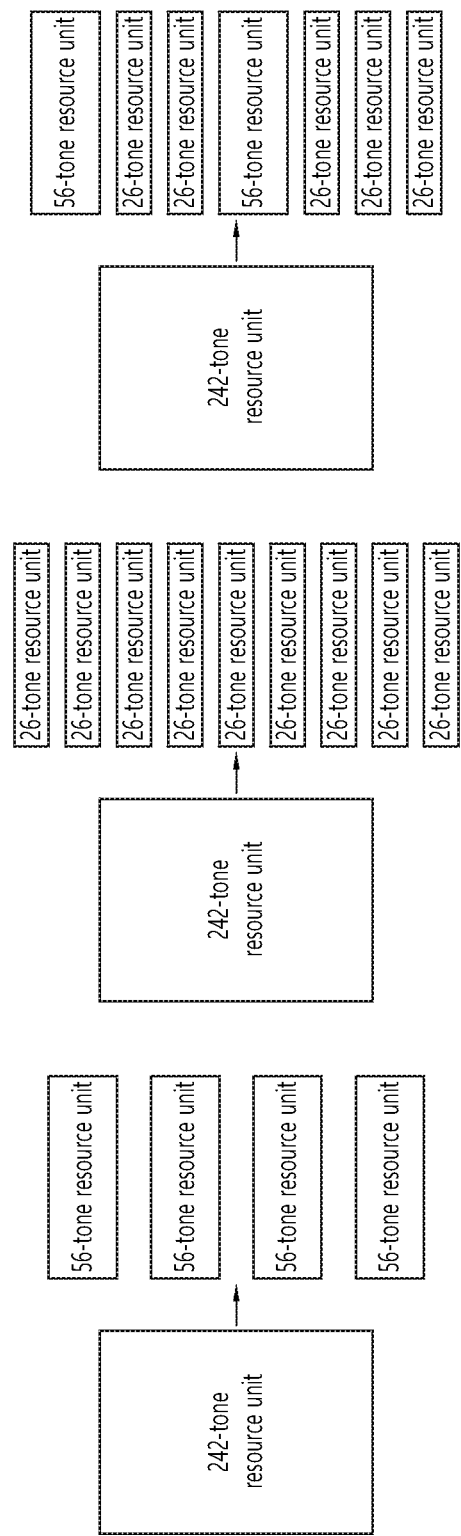
FIG. 12 is a conceptual view illustrating a division of a 242-tone resource unit according to an exemplary embodiment of the present invention.

FIG. 12 is a conceptual view illustrating a division of a 242-tone resource unit according to an exemplary embodiment of the present invention.

FIG. 12 discloses a method of dividing the 242-tone resource unit to smaller resource units (56-tone resource units, 26-tone resource units).

Referring to FIG. 12, according to the exemplary embodiment of the present invention, the 242-tone resource unit may be divided into a combination of resource unit having relatively smaller sizes and may then be used. For example, the 242-tone resource unit may be configured based on at least one 56-tone resource unit and/or at least one 26-tone resource unit.

Referring to the left side of FIG. 12, four 56-tone resource units (56 tones*4=224 tones) may be used instead of the 242-tone resource unit. In this case, a sufficient number of leftover tones may be included in the 242-tone resource unit. Accordingly, the leftover tones may be used as guard tones.

Referring to the middle of FIG. 12, nine 26-tone (26 tone*9=234 tones) resource units may be used instead of the 242-tone resource unit. In this case, 8 tones of leftover tones may be included in the 242-tone resource unit, and the 8-tone leftover tone may be used as guard tones for the nine 26-tone resource units.

Referring to the right side of FIG. 12, two 56-tone resource units and five 26-tone resource units may be used instead of the 242-tone resource unit. In this case, part of the resource unit (e.g., a 26-tone resource unit or a 13-tone resource unit, which corresponds to a divided half of the 26-tone resource unit) is not used, and, accordingly, a sufficient number of leftover tones may be ensured.

Alternatively, the configuration of the 56-tone resource unit and the 26-tone resource unit may be varied, so as to configure the 56-tone resource unit of two 26-tone resource units and leftover tones, or to configure the 56-tone resource unit by combining two 26-tone resource units and leftover tones.

In this case, four 56-tone resource units and one 26-tone resource unit or three 56-tone resource units and three 26-tone resource units may be used instead of the two 56-tone resource units and five 26-tone resource units.

Figure 13:
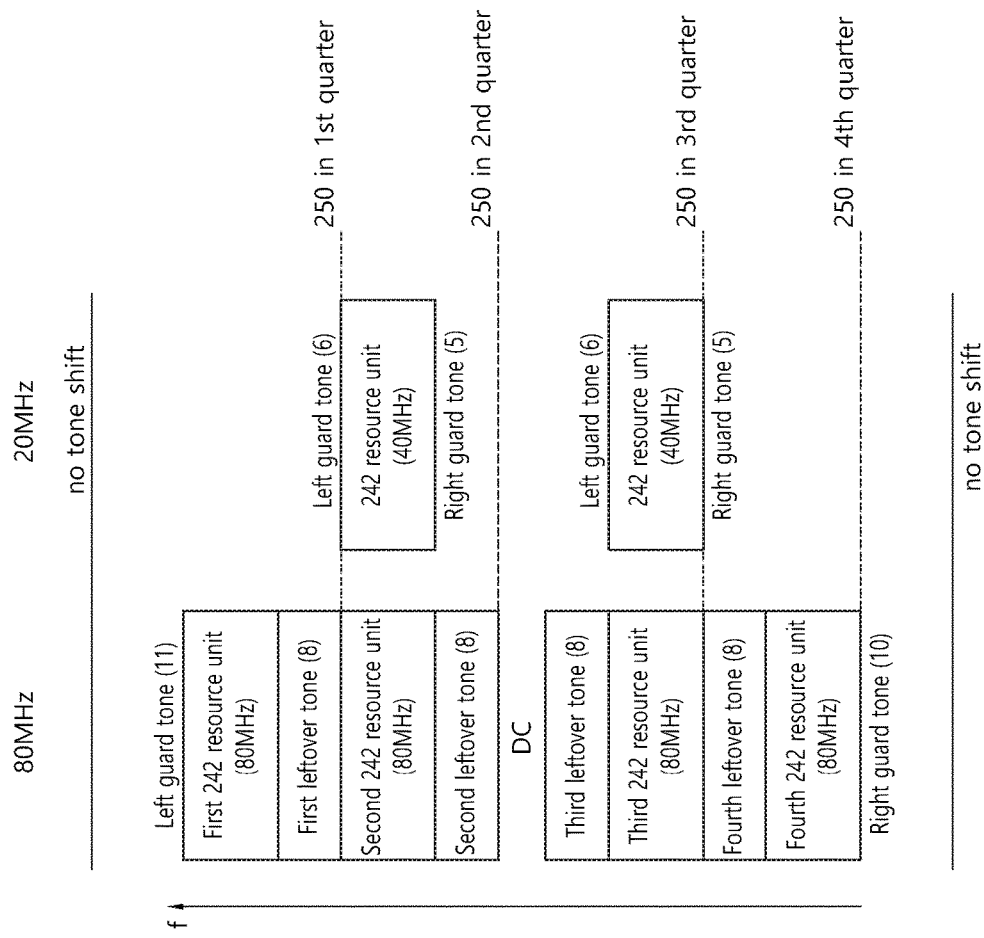
FIG. 13 is a conceptual view illustrating a resource allocation method within a 20 MHz bandwidth according to an exemplary embodiment of the present invention.

FIG. 13 is a conceptual view illustrating a resource allocation method within a 20 MHz bandwidth according to an exemplary embodiment of the present invention.

FIG. 13 discloses a resource allocation method within the 20 MHz bandwidth, in case shifting of the bandwidth cannot be performed. According to the exemplary embodiment of the present invention, in case of performing resource allocation for the 20 MHz bandwidth (or in case of performing resource allocation corresponding to an STA supporting the 20 MHz front-end bandwidth), shifting of the bandwidth may be impossible. This is because, in case shifting of the bandwidth is performed, since all of the resource blocks may be shifted, the bandwidth may be operated at a low efficiency.

Therefore, in case shifting of the bandwidth is not possible, the following resource allocation may be performed.

In the 80 MHz bandwidth, each of the left guard tone (or left-most guard tone) and the right guard tone (or right-most guard tone) may be respectively configured to be equal to 11 tones and 10 tones. Also, in the 80 MHz bandwidth, a left guard tone, a first 242-tone resource unit (80 MHz), a first leftover tone, a second 242-tone resource unit (80 MHz), a second leftover tone, a DC tone, a third leftover tone, a third 242-tone resource unit (80 MHz), a fourth leftover tone, a fourth 242-tone resource unit (80 MHz), and a right guard tone may be allocated.

The left guard tone (6 tones), the 242-tone resource unit (20 MHz)+DC tone, and right guard tone (5 tones) of the 20 MHz bandwidth may be allocated.

In this case, the 242-tone resource unit that is allocated in the 20 MHz bandwidth may be allocated to correspond to the second 242-tone resource unit (80 MHz) that is adjacent to the DC tone or the third 242-tone resource unit (80 MHz). In other words, the first 242-tone resource unit (80 MHz) and the fourth 242-tone resource unit (80 MHz), which are adjacent to the end of the 80 MHz bandwidth, may not correspond to the 242-tone resource unit (20 MHz).

At this point, the positions of the second 242-tone resource unit (80 MHz) and the third 242-tone resource unit (80 MHz) may be adjusted based on the allocation of the leftover tones and may then be configured to correspond to the 242-tone resource unit (20 MHz).

Figure 14:
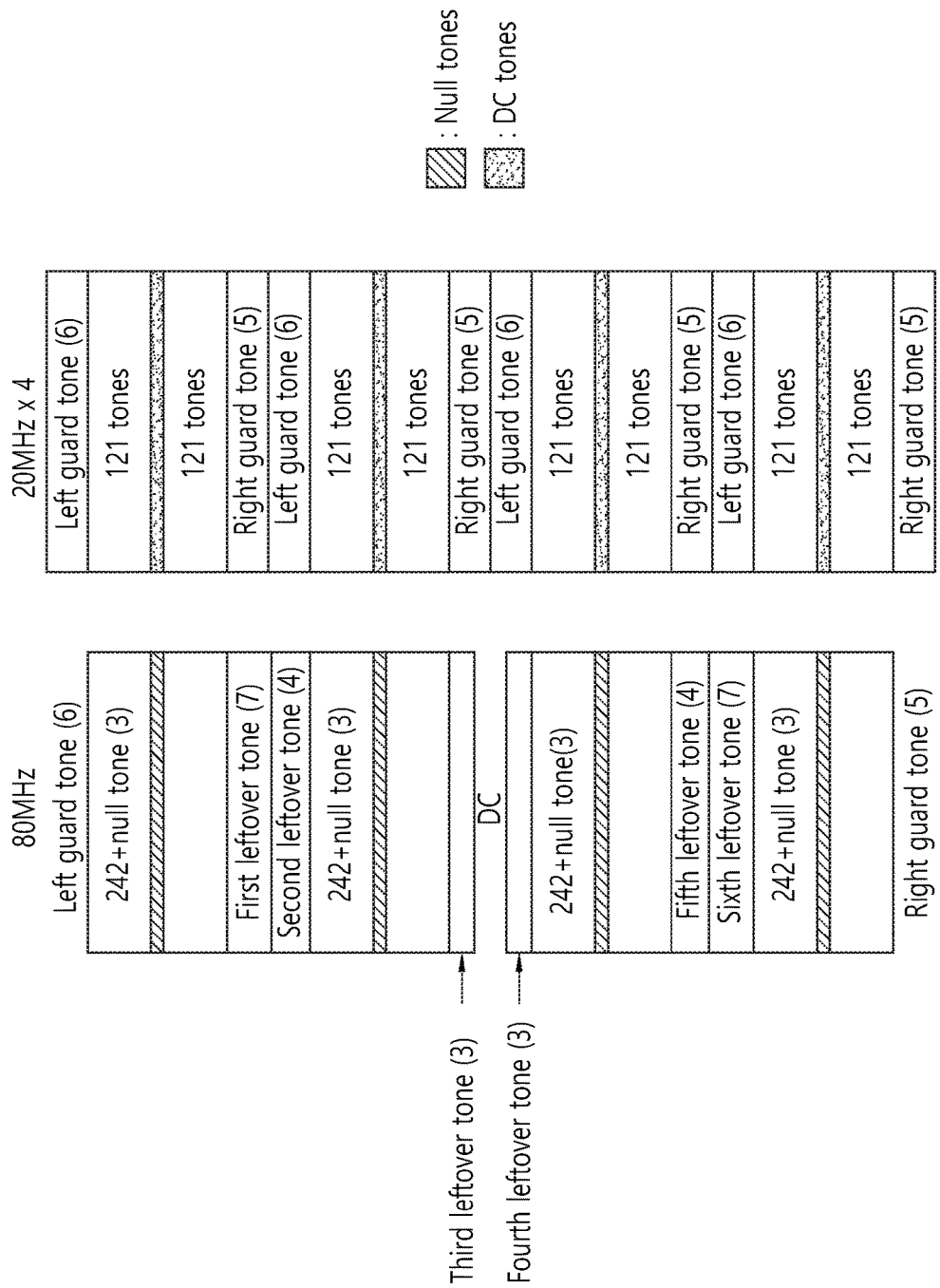
FIG. 14 is a conceptual view illustrating a resource allocation method within a 20 MHz bandwidth according to an exemplary embodiment of the present invention.

FIG. 14 is a conceptual view illustrating a resource allocation method within a 20 MHz bandwidth according to an exemplary embodiment of the present invention.

FIG. 14 also discloses a resource allocation method within the 20 MHz bandwidth, in case shifting of the bandwidth cannot be performed. FIG. 14 discloses a resource allocation method within the 20 MHz bandwidth without any shifting of the 20 MHz bandwidth based on an adjustment of the number of left guard tones/right guard tones, which are defined in the 80 MHz bandwidth.

In the 80 MHz bandwidth, the left guard tone may be configured to be equal to 6 tones, and the right guard tone may be configured to be equal to 5 tones. Also, in the 80 MHz bandwidth, a left guard tone, a first 242-tone resource unit (80 MHz), a second 242-tone resource unit (80 MHz), a DC tone, a third 242-tone resource unit (80 MHz), a fourth 242-tone resource unit (80 MHz), and a right guard tone may be allocated.

The left guard tone (6 tones), the 242-tone resource unit (20 MHz)+DC tone, and right guard tone (5 tones) of the 20 MHz bandwidth may be allocated.

In this case, the 242-tone resource unit (20 MHz) may correspond to the first 242-tone resource unit (80 MHz), the second 242-tone resource unit (80 MHz), the third 242-tone resource unit (80 MHz), or the fourth 242-tone resource unit (80 MHz). More specifically, the 242-tone resource unit (20 MHz) may correspond to any one 242-tone resource unit (80 MHz) among the four 242-tone resource units (80 MHz), which are included in the 80 MHz bandwidth.

Figure 15:
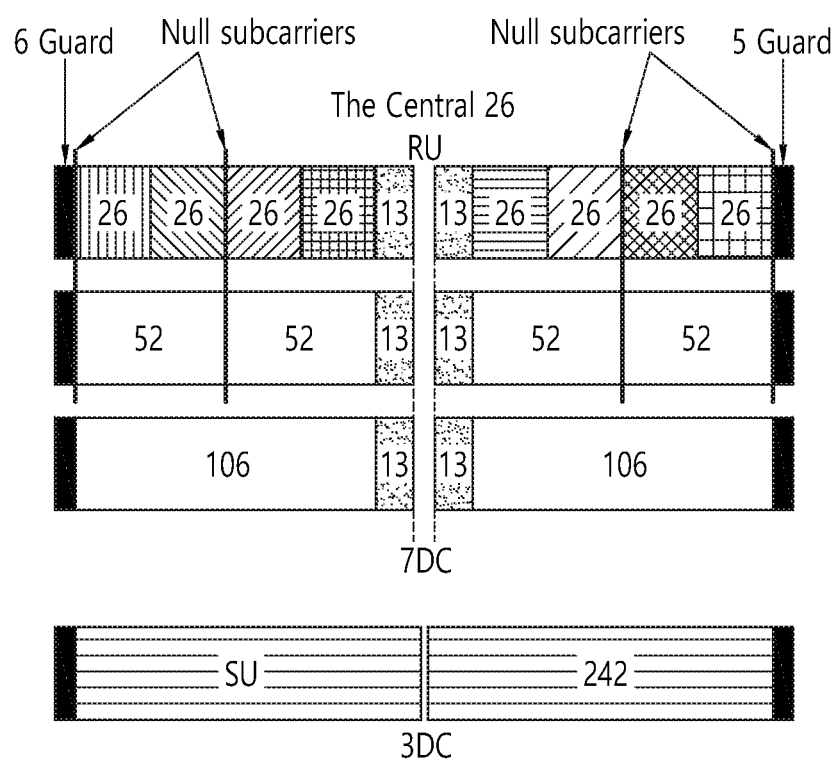
FIG. 15 is a diagram illustrating a layout of resource units (RUs) used in a band of 20 MHz.
Figure 16:
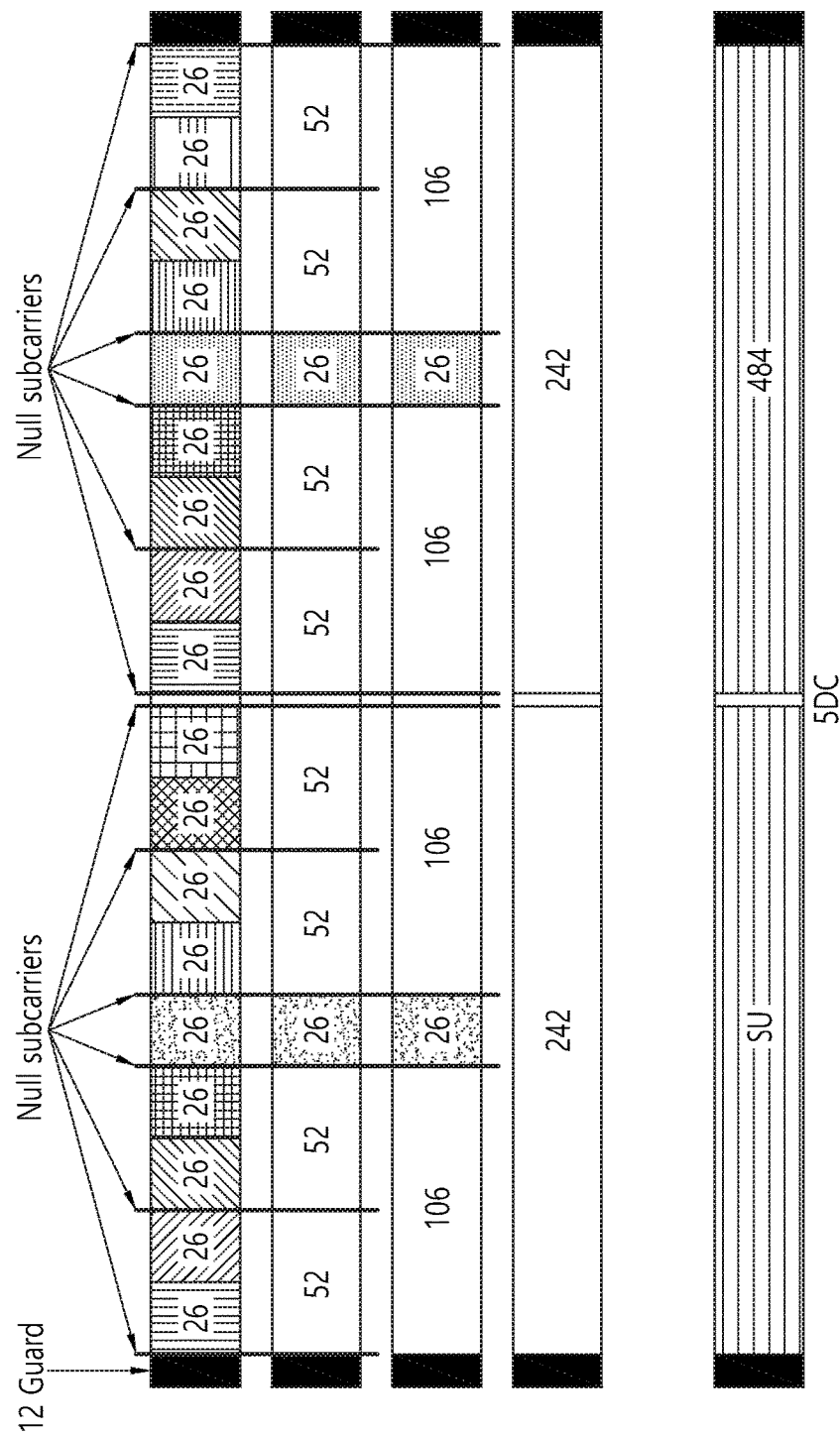
FIG. 16 is a diagram illustrating a layout of resource units (RUs) used in a band of 40 MHz.
Figure 17:
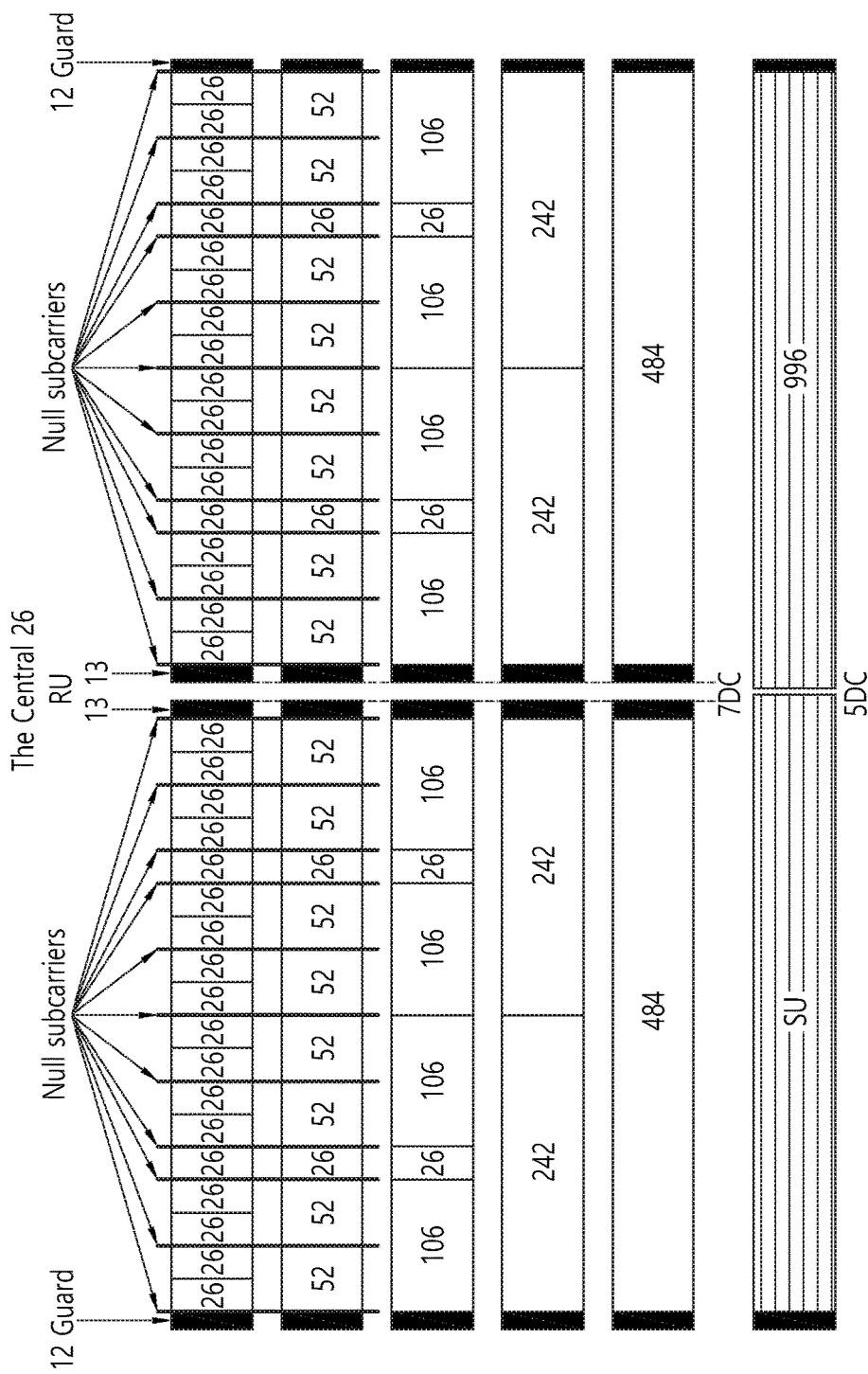
FIG. 17 is a diagram illustrating a layout of resource units (RUs) used in a band of 80 MHz.

Based on the examples presented in FIG. 2 to FIG. 14, which are described above, detailed examples related to the resource units that are used within 20 MHz, 40 MHz, and 80 MHz may correspond to the examples of FIG. 15 to FIG. 17.

More specifically, FIG. 15 is a diagram illustrating a layout of resource units (RUs) used in a band of 20 MHz.

As illustrated in FIG. 15, resource units (RUs) corresponding to tone (i.e., subcarriers) of different numbers are used to constitute some fields of the HE-PPDU. For example, the resources may be allocated by the unit of the RU illustrated with respect to the HE-STF, the HE-LTF, and the data field.

As illustrated in an uppermost part of FIG. 15, 26 units (i.e., units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, i.e., a DC band and a 26-unit corresponding to each 13 tones may be present at left and right sides of the DC band. The 26-unit, a 52-unit, and a 106-unit may be allocated to other bands. Each unit may be allocated for a receiving station, i.e., a user.

Meanwhile, the RU layout (or arrangement) of FIG. 15 may be used even in a situation for a single user (SU) in addition to the multiple users (MUs) and in this case, as illustrated in a lowermost part of FIG. 15, one 242-unit may be used and in this case, three DC tones may be inserted.

In one example of FIG. 15, RUs having various sizes, i.e., a 26-RU, a 52-RU, a 106-RU, a 242-RU, and the like are proposed, and as a result, since detailed sizes of the RUs may extend or increase, the embodiment is not limited to a detailed size (i.e., the number of corresponding tones) of each RU.

FIG. 16 is a diagram illustrating a layout of resource units (RUs) used in a band of 40 MHz.

Similarly to a case in which the RUs having various RUs are used in one example of FIG. 15, 26-RU, 52-RU, 106-RU, 242-RU, 484-RU, and the like may be used even in one example of FIG. 16. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 16, when the RU layout is used for the single user, the 484-RU may be used. That is, the detailed number of RUs may be modified similarly to one example of FIG. 15.

FIG. 17 is a diagram illustrating a layout of resource units (RUs) used in a band of 80 MHz.

Similarly to a case in which the RUs having various RUs are used in one example of each of FIG. 15 or FIG. 16, 26-RU, 52-RU, 106-RU, 242-RU, 484-RU, and the like may be used even in one example of FIG. 17. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 17, when the RU layout is used for the single user, 996-RU may be used and in this case, 5 DC tones may be inserted. Meanwhile, the detailed number of RUs may be modified similarly to one example of each of FIG. 15 or FIG. 16.

Pilot tones may be allocated to resource units shown in the examples of FIG. 15 to FIG. 17 in accordance with a predetermined pattern, and detailed positions of the corresponding pilot tones may be determined in accordance with the size of the RU to which the pilot tones are mapped.

Figure 18:
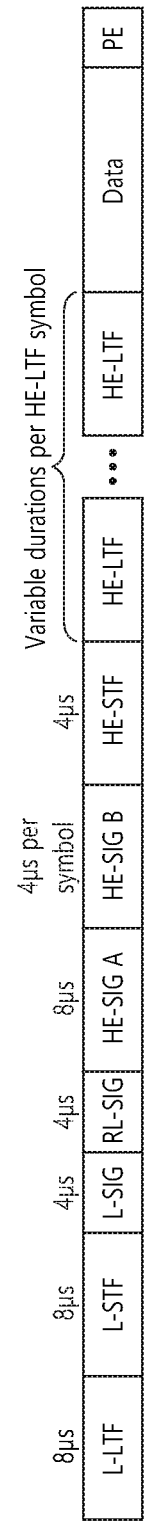
FIG. 18 is a diagram illustrating an example of an HE PDDU.

FIG. 18 is a diagram illustrating an example of an HE PDDU.

The control information field provided in the embodiment may be the HE-SIG-B included in the HE PPDU. The HE PPDU according to FIG. 18 is one example of the PPDU for multiple users and only the PPDU for the multiple users may include the HE-SIG-B and the corresponding HE SIG-B may be omitted in a PPDU for a single user.

As illustrated in FIG. 18, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (or an MAC payload), and a packet extension (PE) field. The respective fields may be transmitted during an illustrated time period (i.e., 4 or 8 μs). More detailed description of the respective fields of FIG. 18 will be made below.

Figure 19:
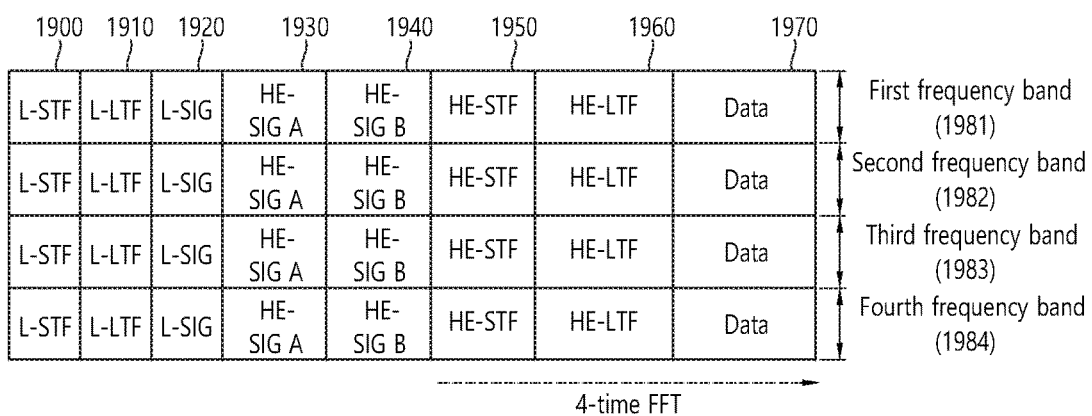
FIG. 19 is a diagram illustrating another example of the HE PPDU.

FIG. 19 is a diagram illustrating another example of the HE PPDU.

A block illustrated in FIG. 19 is another example of describing the HE-PPDU block of FIG. 18 in terms of a frequency.

An illustrated L-STF 1900 may include a short training orthogonal frequency division multiplexing (OFDM) symbol. The L-STF 1900 may be used for frame detection, automatic gain control (AGC), diversity detection, and coarse frequency/time synchronization.

An L-LTF 1910 may include a long training orthogonal frequency division multiplexing (OFDM) symbol. The L-LTF 1910 may be used for fine frequency/time synchronization and channel prediction.

An L-SIG 1920 may be used for transmitting control information. The L-SIG 1920 may include information regarding a data rate and a data length. Further, the L-SIG 1920 may be repeatedly transmitted. That is, a new format, in which the L-SIG 1920 is repeated (for example, this may be referred to as R-LSIG) may be configured.

An HE-SIG-A 1930 may include the control information common to the receiving station.

In detail, the HE-SIG-A 1930 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

An HE-SIG-B 1940 may be included only in the case of the PPDU for the multiple users (MUs) as described above. Principally, an HE-SIG-A 1950 or an HE-SIG-B 1960 may include resource allocation information (or virtual resource allocation information) for at least one receiving STA.

The HE-SIG-B field 1950 may include a common field in its foremost part, and the corresponding field may be encoded separately from its following field(s). More specifically, the HE-SIG-B field may include a common field including common control information, and a user-specific field including user-specific control information. In this case, the common field may include a corresponding CRC field, and so on, and may be coded as a single BCC block. Thereafter, as shown in the drawing, the subsequent user-specific field may include a "user-specific field" for two users (2 users) and the corresponding CRC fields, and so on, and may each be coded as one BCC block.

The fields before the HE-SIG B 1940 within the MU PPDU may be transmitted in a duplicated format. In case of the HE-SIG B 1940, the HE-SIG B 1940 being transmitted from part of the frequency band (e.g., the fourth frequency band) may also include a data field of the corresponding frequency band (e.g., fourth frequency band) and control information for data fields of other frequency bands (e.g., second frequency band) excluding the corresponding frequency band. Additionally, the HE-SIG-B 1940 of (a specific frequency band (e.g., second frequency band) may correspond to a duplicated format of the HE-SIG-B 1940 of another frequency band (e.g., fourth frequency band). Alternatively, the HE-SIG B 1940 may be transmitted in an encoded format within all of the transmission resources. And, the fields after the HE-SIG B 1940 may include separate information for each of the plurality of STAs receiving the PPDU.

The HE-STF 1950 may be used for enhancing automatic gain control estimation in a multiple input multiple output (MIMO) environment or an OFDMA environment.

The HE-LTF 1960 may be used for estimating a channel in a MIMO environment or an OFDMA environment.

The FFT/IFFT size being applied to the HE-STF 1950 and the field after the HE-STF 1950 may be different from the FFT/IFFT size being applied to the field before the HE-STF 1950. For example, the FFT/IFFT size being applied to the HE-STF 1950 and the field after the HE-STF 1950 may be 4 times larger than the IFFT size being applied to the field before the HE-STF 1950.

For example, among the L-STF 1900, the L-LTF 1910, the L-SIG 1920, the HE-SIG-A 1930, and the HE-SIG-B 1940 within the PPDU of FIG. 19, in case at least one of the fields listed above is referred to as a first field, at least one of the data field 1970, HE-STF 1950, and the HE-LTF 1960 may be referred to as a second field. The first field may include fields related to the legacy system, and the second field may include field related to the HE system. In this case, a fast fourier transform (FFT) size/inverse fast fourier transform (IFFT) size may be defined as N-times (wherein N is an integer, e.g., N=1, 2, 4) of the FFT/IFFT sizes that were used in the legacy Wireless LAN system. In other words, a FFT/IFFT having a size N(=4) times larger than that of the first field of the HE PPDU may be applied to the second field of the HE PPDU. For example, 256 FFT/IFFT may be applied for a 20 MHz bandwidth, 512 FFT/IFFT may be applied for a 40 MHz bandwidth, 1024 FFT/IFFT may be applied for an 80 MHz bandwidth, and 2048 FFT/IFFT may be applied to a contiguous 160 MHz bandwidth or a non-contiguous 160 MHz bandwidth.

In other words, subcarrier spacing may correspond to a 1/N-times size (wherein N is an integer, e.g., when N=4, 78.125 kHz) of the subcarrier spacing that was used in the legacy Wireless LAN system. More specifically, subcarrier spacing having a size of 312.5 kHz, which corresponds to the related art subcarrier spacing, may be applied to the first field of the HE PPDU, and subcarrier spacing having a size of 78.125 kHz may be applied to the second field of the HE PPDU.

Alternatively, an IDFT/DFT period being applied to each symbol of the first field may be expressed as being N(=4) times shorter than the IDFT/DFT period being applied to each data symbol of the second field. More specifically, the IDFT/DFT length being applied to each symbol of the first field of the HE PPDU may be expressed as being equal to 3.2 µs, and the IDFT/DFT length being applied to each symbol of the second field of the HE PPDU may be expressed as being equal to 3.2 µs*4(=12.8 µs). The length of an OFDM symbol may correspond to the IDFT/DFT length having a length of a guard interval (GI) added thereto. The length of the GI may have diverse values, such as 0.4 µs, 0.8 µs, 1.6 µs, 2.4 µs, and 3.2 µs.

For simplicity, in FIG. 19, although it is described that the frequency band used by the first field and the frequency band used by the second field correspond to the exact same frequency band, the frequency bands may not actually correspond to the same frequency band. For example, although the main band of the first field (L-STF, L-LTF, L-SIG, HE-SIG-A, HE-SIG-B) corresponding to the first frequency band may be identical to the main band of the second field (HE-STF, HE-LTF, Data), the boundary of each frequency band may not identical to one another. As shown in FIG. 15 to FIG. 17, since a plurality of null subcarriers, DC tones, guard tones, and so on, are inserted during the process of arranging the RUs, it may be difficult to accurately match the boundaries of each frequency band.

The user, i.e., the receiving station (STA) may receive the HE-SIG A 1930 and may receive indication to receive a downlink PPDU based on the HE-SIG A 1930. In this case, the STA may perform decoding based on the HE-STF 1950 and the FFT size that is changed starting from the field after the HE-STF 1950. Conversely, in case the STA fails to receive indication to receive the downlink PPDU based on the HE-SIG A 1930, the STA may suspend the decoding process and may perform network allocation vector (NAV) configuration. A cyclic prefix (CP) of the HE-STF 1950 may have a size that is larger than the CP of other fields, and, during such CP period, the STA may change the FFT size and may perform decoding on the downlink PPDU.

The exemplary embodiment of the present invention proposes a RU allocation method that can be applied in a case when non-contiguous channel bonding or non-contiguous OFDMA allocation is supported.

Figure 20:
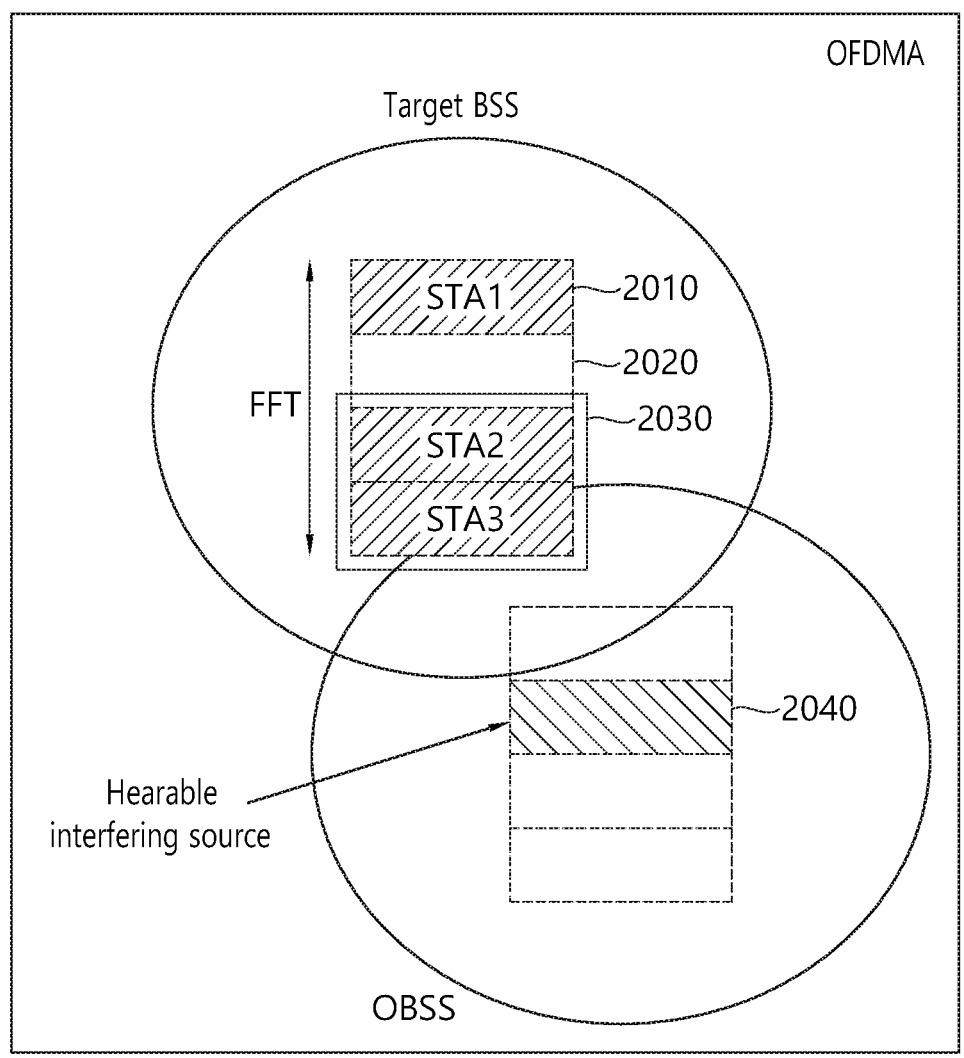
FIG. 20 shows an exemplary situation where non-contiguous channel bonding may become a problematic issue.

FIG. 20 shows an exemplary situation where non-contiguous channel bonding may become a problematic issue.

In the related art wireless LAN system, in order to allocate a wider bandwidth (e.g., a bandwidth exceeding 20 MHz), a multi-channel allocation method was used. However, in this case, restrictions (or constraints) caused by the primary channel rule became a problem. More specifically, according to the related art primary rule, in case a secondary channel being adjacent to the primary channel is used in an overlapped BSS (OBSS) and is, therefore, 'busy', the transmitting station (STA) is incapable of using the remaining channels excluding the primary channel. Therefore, the transmitting STA is only capable of performing transmission through the primary channel, thereby experiencing restrictions in performing frame transmission through the multi-channel.

More specifically, in the case shown in FIG. 20, according to the related art rule, in case a secondary channel 2020, which is adjacent to a primary channel 2010 is 'busy' due to its usage in an OBSS, a transmitting end is incapable of using the remaining channels 2030 excluding the primary channel 2010. However, in case non-contiguous channel bonding is authorized, the transmitting end may use the remaining channels 2030 excluding the primary channel 2010.

In case non-contiguous channel bonding is supported, a problem may occur if the RU arrangement (or layout) shown in FIG. 15 to FIG. 17 is directly used without modification. Accordingly, the exemplary embodiment of the present invention proposes a method for selectively using two types of RU arrangement methods.

Although the method according to the exemplary embodiment of the present invention may be used in diverse frequency bands, for simplicity in the following description, the method of present invention will be presented based on the 80 MHz band.

Figure 21:
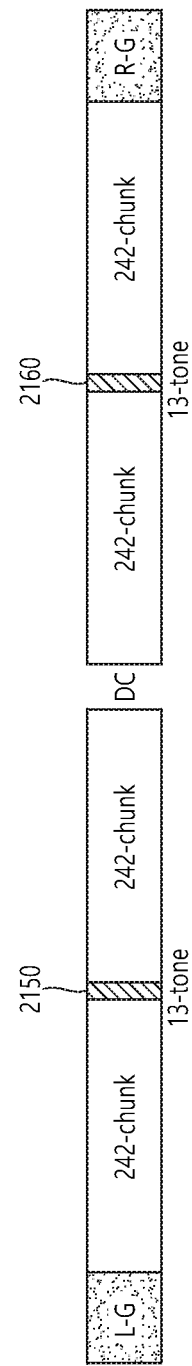
FIG. 21 is an exemplary RU arrangement that can be applied in case non-contiguous channel bonding is performed.

FIG. 21 is an exemplary RU arrangement that can be applied in case non-contiguous channel bonding is performed.

Initially, in a case when the 80 MHz band is problematic as shown in FIG. 17, a central resource unit (central RU), wherein 13 tones respectively positioned on each of the left and right sides of a DC band are non-contiguously included, was included in the central frequency band including a DC band. Such method according to FIG. 17 may be indicated as a "first resource unit arrangement".

The example shown in FIG. 21 represents a concept of a "second resource unit arrangement" that is different from the above-described "first resource unit arrangement". More specifically, a central resource unit, which is configured of a predetermined number of unit (e.g., 7 units), is no longer included on the left/right sides of the DC band. Instead, a second frequency chunk 2120 and a third frequency chunk 2130 are arranged to be contiguous to the DC band.

The 13 tones that were initially positioned on the left side of the DC band is inserted between the first frequency chunk 2110 and the second frequency chunk 2120, and the 13 tones that were initially positioned on the right side of the DC band is inserted between the third frequency chunk 2130 and the fourth frequency chunk 2140.

As shown in FIG. 20, in case the non-contiguous channel bonding becomes problematic, the neighboring transmitting stations (STA) (e.g., OBSS) may use a specific 20 MHz band (or 2 or more 20 MHz bands). In case a neighboring transmitting station uses a specific band, interference may occur in at least one of the frequency chunks shown in FIG. 21. In order to resolve the problem of interference, the previously used central resource unit may be used as a guard tone/guard band between each frequency chunk in the example shown in FIG. 21. More specifically, each set of the 13 tones 2150 and 2160, shown in the drawing, may correspond to a null tone/null subcarrier. Evidently, the corresponding tone 2150 and 2160 may be used for the purposes of ACK/NACK signal transmission, control signal transmission, and/or other channel measurement. However, in case of resolving the problem of interference in a neighboring OBSS, and so on, it is preferable to allocate the corresponding tone as a null tone/null subcarrier.

In summary, it is preferable to use the "first resource unit arrangement" method in a case when the non-contiguous channel bonding is not applied, and it is preferable to use the "second resource unit arrangement" method in a case when the non-contiguous channel bonding is applied. In case the non-contiguous channel bonding is applied, it may be possible to always use the "second resource unit arrangement" method, and it may also be possible to perform an addition determination process and perform a final examination (or review) on whether or not to use the "second resource unit arrangement" method. More specifically, it may be possible that the transmitting station verifies other HE-PPDUs corresponding to narrow bands 20 MHz, 40 MHz, or 80 MHz being received from the OBSS and, then, determined the corresponding level of interference, thereby determining whether or not to apply the "second resource unit arrangement" method.

Regardless of whether the interference signal occurs in any one of the first/second/third/fourth frequency chunks, the "second resource unit arrangement" may be equally applied. More specifically, in a situation where the RU arrangement of FIG. 17 is used, if multiple RU arrangement methods are additionally used, this may increase a level of complexity in scheduling. Therefore, the "second resource unit arrangement" may be used regardless of the frequency band being used by the interference signal. In other words, only the first and second resource unit arrangements correspond to the arrangement methods that are authorized to the transmitting station.

Meanwhile, the exemplary embodiment of the present invention may determine whether or not to apply non-contiguous channel bonding by using diverse methods. For example, it is possible to determine whether or not to apply the non-contiguous channel bonding by using a PPDU that is received from a neighboring OBSS, or it is also possible to determine whether or not to apply the non-contiguous channel bonding by referring to the signaling from other external entities.

Figure 22:
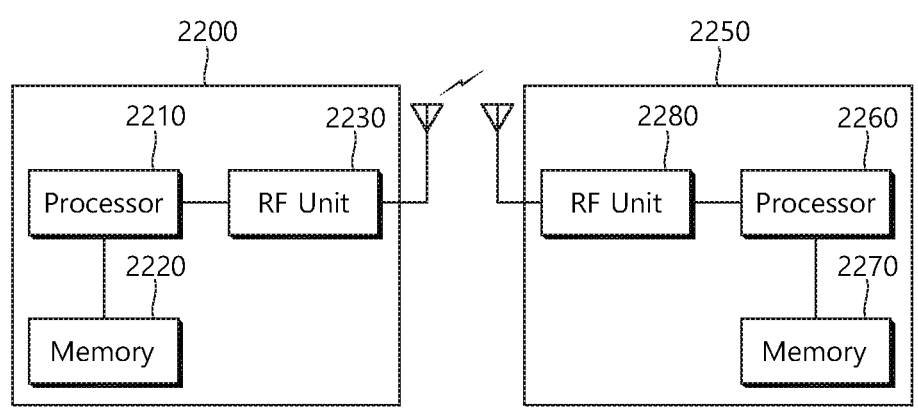
FIG. 22 is a block diagram showing an apparatus for wireless communication for implementing an embodiment of the present invention.

FIG. 22 is a block view illustrating a wireless device to which the exemplary embodiment of the present invention can be applied.

Referring to FIG. 122, as an STA that can implement the above-described exemplary embodiment, the wireless device may correspond to an AP 2200 or a non-AP station 2250.

The AP 2200 includes a processor 2210, a memory 2220, and a radio frequency (RF) unit 2230.

The RF unit 2230 is connected to the processor 2210, thereby being capable of transmitting and/or receiving radio signals.

The processor 2210 implements the functions, processes, and/or methods proposed in the present invention. For example, the processor 2210 may be implemented to perform the operations of the AP according to the above-described exemplary embodiments of the present invention. The processor may perform the operations of the AP, which are disclosed in the exemplary embodiments of FIG. 1 to FIG. 21.

The non-AP STA 2250 includes a processor 2260, a memory 2270, and a radio frequency (RF) unit 2280.

The RF unit 2280 is connected to the processor 2260, thereby being capable of transmitting and/or receiving radio signals.

The processor 2260 implements the functions, processes, and/or methods proposed in the present invention. For example, the processor 2260 may be implemented to perform the operations of the non-AP STA according to the above-described exemplary embodiments of the present invention. The processor may perform the operations of the non-AP STA, which are disclosed in the exemplary embodiments of FIG. 1 to FIG. 21.

For example, the processor 2260 may receive downlink data or transmit uplink data based on resource units (or wireless resource) scheduled by the AP.

The processor 2210 and 2260 may include an application-specific integrated circuit (ASIC), another chip set, a logical circuit, a data processing device, and/or a converter converting a baseband signal and a radio signal to and from one another. The memory 2220 and 2270 may include a read-only memory (ROM), a random access memory (RAM), a flash memory, a memory card, a storage medium, and/or another storage device. The RF unit 2230 and 2280 may include one or more antennas transmitting and/or receiving radio signals.

When the exemplary embodiment is implemented as software, the above-described method may be implemented as a module (process, function, and so on) performing the above-described functions. The module may be stored in the memory 2220 and 2270 and may be executed by the processor 2210 and 2260. The memory 2220 and 2270 may be located inside or outside of the processor 2210 and 2260 and may be connected to the processor 2210 and 2260 through a diversity of well-known means.

What is claimed is:

1. A method for transmitting a signal by using a plurality of resource units (RUs) having subcarriers allocated thereto in a wireless local area network (LAN) system, comprising:
    determining, by a transmitting station, whether or not to apply non-contiguous channel allocation not using at least one of a plurality of unit channels;
    in case the non-contiguous channel allocation is not applied, configuring, by the transmitting station, a physical protocol data unit (PPDU) by using a first resource unit arrangement;
    in case the non-contiguous channel allocation is applied, configuring, by the transmitting station, a PPDU by using a second resource unit arrangement; and
    transmitting the PPDU,
    wherein, in case the first resource unit arrangement is used, the transmitting station configures the PPDU by using a central resource unit (RU) including a non-contiguous tone group within a central frequency band including a direct current (DC) band, and
    wherein, in case the second resource unit arrangement is used, the transmitting station configures the PPDU without using the central RU.

2. The method of claim 1, wherein, in case the second resource unit arrangement is used, a first guard band is allocated between a first frequency chunk being contiguous to a left guard band and a second frequency chunk, wherein the second frequency chunk is arranged between the central frequency band and the first frequency chunk, and wherein a second guard band is allocated between a fourth frequency chunk being contiguous to a right guard band and a third frequency chunk, wherein the third frequency chunk is arranged between the central frequency chunk and the fourth frequency chunk.

3. The method of claim 2, wherein a sum of a size of the first guard band and a size of the second guard band is equal to a size of the central resource unit.

4. The method of claim 2, wherein each of the first frequency chunk to the fourth frequency chunk corresponds to a 242-RU, wherein each of the first guard band and the second guard band corresponds to 13 tones, and wherein the central resource unit corresponds to non-contiguous 26 tones.

5. The method of claim 1, further comprising:
    verifying, by the transmitting station, a bandwidth of a PPDU being received from a neighboring station, in order to determine whether or not to apply the non-contiguous channel allocation.

6. The method of claim 1, wherein, in case the first resource unit arrangement is used, a first frequency chunk being contiguous to a left guard band and a second frequency chunk being contiguous to the first frequency chunk are used, wherein a fourth frequency chunk being contiguous to a right guard band and a third frequency chunk being contiguous to the fourth frequency chunk are used, and wherein the central resource unit (RU) is arranged between the second frequency chunk and the fourth frequency chunk.

7. A transmitting station for transmitting a signal by using a plurality of resource units (RUs) having subcarriers allocated thereto in a wireless local area network (LAN) system, comprising:
    a radio frequency (RF) unit transmitting and receiving radio signals; and
    a processor controlling the RF unit,
    wherein the processor is configured:
    to determine whether or not to apply non-contiguous channel allocation not using at least one of a plurality of unit channels, to configure a physical protocol data unit (PPDU) by using a first resource unit arrangement, in case the non-contiguous channel allocation is not applied, to configure a PPDU by using a second resource unit arrangement, in case the non-contiguous channel allocation is applied, and to transmit the PPDU, wherein, in case the first resource unit arrangement is used, the transmitting station configures the PPDU by using a central resource unit (RU) including a non-contiguous tone group within a central frequency band including a direct current (DC) band, and wherein, in case the second resource unit arrangement is used, the transmitting station configures the PPDU without using the central RU.

8. The transmitting station of claim 7, wherein, in case the second resource unit arrangement is used, a first guard band is allocated between a first frequency chunk being contiguous to a left guard band and a second frequency chunk, wherein the second frequency chunk is arranged between the central frequency band and the first frequency chunk, and wherein a second guard band is allocated between a fourth frequency chunk being contiguous to a right guard band and a third frequency chunk, wherein the third frequency chunk is arranged between the central frequency chunk and the fourth frequency chunk.

9. The transmitting station of claim 8, wherein a sum of a size of the first guard band and a size of the second guard band is equal to a size of the central resource unit.

10. The transmitting station of claim 8, wherein each of the first frequency chunk to the fourth frequency chunk corresponds to a 242-RU, wherein each of the first guard band and the second guard band corresponds to 13 tones, and wherein the central resource unit corresponds to non-contiguous 26 tones.

11. The transmitting station of claim 7, wherein the processor is further configured to verify a bandwidth of a PPDU being received from a neighboring station, in order to determine whether or not to apply the non-contiguous channel allocation.

12. The transmitting station of claim 7, wherein, in case the first resource unit arrangement is used, a first frequency chunk being contiguous to a left guard band and a second frequency chunk being contiguous to the first frequency chunk are used, wherein a fourth frequency chunk being contiguous to a right guard band and a third frequency chunk being contiguous to the fourth frequency chunk are used, and wherein the central resource unit (RU) is arranged between the second frequency chunk and the fourth frequency chunk.

* * * * *